United States Patent
Zalewski

(10) Patent No.: US 8,323,106 B2
(45) Date of Patent: Dec. 4, 2012

(54) DETERMINATION OF CONTROLLER THREE-DIMENSIONAL LOCATION USING IMAGE ANALYSIS AND ULTRASONIC COMMUNICATION

(75) Inventor: Gary M. Zalewski, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1143 days.

(21) Appl. No.: 12/145,455

(22) Filed: Jun. 24, 2008

(65) Prior Publication Data

US 2008/0261693 A1 Oct. 23, 2008

Related U.S. Application Data

(60) Provisional application No. 61/057,783, filed on May 30, 2008.

(51) Int. Cl.
*A63F 9/24* (2006.01)

(52) U.S. Cl. .............................................. 463/31; 30/32

(58) Field of Classification Search .................... 463/30, 463/31, 32
See application file for complete search history.

(56) References Cited

U.S. PATENT DOCUMENTS

| | | | |
|---|---|---|---|
| 3,943,277 A | 3/1976 | Everly et al. ................ 348/19 |
| 4,263,504 A | 4/1981 | Thomas ....................... 235/454 |
| 4,313,227 A | 1/1982 | Eder ............................. 398/106 |
| 4,558,864 A | 12/1985 | Medwedeff ............... 273/148 B |
| 4,565,999 A | 1/1986 | King et al. ................... 345/158 |
| 4,787,051 A | 11/1988 | Olson ........................... 364/518 |
| 4,802,227 A | 1/1989 | Elko et al. ...................... 381/92 |
| 4,823,001 A | 4/1989 | Kobayashi et al. ........... 356/616 |
| 4,843,568 A | 6/1989 | Krueger et al. ............... 382/100 |
| 4,963,858 A | 10/1990 | Chien .......................... 340/710 |
| 5,034,986 A | 7/1991 | Karmann et al. ............. 382/103 |
| 5,055,840 A | 10/1991 | Bartlett ........................... 341/31 |
| 5,111,401 A | 5/1992 | Everett et al. .................. 701/24 |
| 5,128,671 A | 7/1992 | Thomas, Jr. .................... 341/20 |
| 5,144,594 A | 9/1992 | Gilchrist ....................... 367/129 |
| 5,260,556 A | 11/1993 | Lake et al. .................... 235/494 |
| 5,297,061 A | 3/1994 | Dementhon et al. .......... 345/180 |
| 5,317,140 A | 5/1994 | Dunthorn | |
| 5,335,011 A | 8/1994 | Addeo et al. .................... 378/15 |

(Continued)

FOREIGN PATENT DOCUMENTS

EP 0353200 1/1990

(Continued)

OTHER PUBLICATIONS

"The Tracking Cube: A Three-Dimentional Input Device", IBM Technical Disclosure Bulletin, Aug. 1, 1989, pp. 91-95, No. 3B, IBM Corp.New York, U.S.

(Continued)

*Primary Examiner* — David L Lewis
*Assistant Examiner* — Shauna-Kay Hall
(74) *Attorney, Agent, or Firm* — Martine Penilla Group, LLP

(57) ABSTRACT

Game interface tracks the position of one or more game controllers in 3-dimensional space using hybrid video capture and ultrasonic tracking system. The captured video information is used to identify a horizontal and vertical position for each controller within a capture area. The ultrasonic tracking system analyzes sound communications to determine the distances between the game system and each controller and to determine the distances among the controllers. The distances are then analyzed by the game interface to calculate the depths within the capture area for each controller.

27 Claims, 30 Drawing Sheets

U.S. PATENT DOCUMENTS

| | | | |
|---|---|---|---|
| 5,394,168 A | 2/1995 | Smith, III et al. | 345/156 |
| 5,426,450 A | 6/1995 | Drumm | 345/168 |
| 5,453,758 A | 9/1995 | Sato | 345/158 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,517,333 A | 5/1996 | Tamura et al. | 358/158 |
| 5,528,265 A | 6/1996 | Harrison | 345/158 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,505 A | 3/1999 | Toyama et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,917,936 A | 6/1999 | Katto | 382/154 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netzer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | 382/276 |
| 6,014,167 A | 1/2000 | Suito et al. | 348/169 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,072,494 A | 6/2000 | Nguyen | 715/863 |
| 6,075,895 A | 6/2000 | Qiao et al. | 382/218 |
| 6,078,789 A * | 6/2000 | Bodenmann et al. | 455/41.2 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/113 |
| 6,157,368 A | 12/2000 | Faeger | 345/156 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,074 B1 | 6/2001 | Fishkin et al. | 345/156 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,375,572 B1 | 4/2002 | Masuyama et al. | 463/43 |
| 6,392,644 B1 | 5/2002 | Miyata et al. | 345/419 |
| 6,393,142 B1 | 5/2002 | Swain et al. | 382/154 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,504,535 B1 | 1/2003 | Edmark | 345/419 |
| 6,513,160 B2 | 1/2003 | Dureau | 725/9 |
| 6,516,466 B1 | 2/2003 | Jackson | 725/62 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,593,956 B1 | 7/2003 | Potts et al. | 348/14.09 |
| 6,595,642 B2 | 7/2003 | Wirth | 351/211 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,676,522 B2 | 1/2004 | Rowe et al. | 463/42 |
| 6,677,967 B2 | 1/2004 | Sawano et al. | 715/839 |
| 6,677,987 B1 | 1/2004 | Girod | 348/171 |
| 6,708,789 B1 | 3/2004 | Albuquerque De Souza E Silva | 180/65.2 |
| 6,709,108 B2 | 3/2004 | Levine et al. | 351/211 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podoleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,847,311 B2 | 1/2005 | Li | 341/28 |
| 6,863,609 B2 | 3/2005 | Okuda et al. | 463/36 |
| 6,881,147 B2 | 4/2005 | Naghi et al. | 463/35 |
| 6,884,171 B2 | 4/2005 | Eck et al. | 463/42 |

| | | | | | | |
|---|---|---|---|---|---|---|
| 6,890,262 B2 | 5/2005 | Oishi et al. ............. 463/31 | | 2002/0075286 A1 | 6/2002 | Yonezawa et al. ............ 345/679 |
| 6,917,688 B2 | 7/2005 | Yu et al. ............. 381/94.7 | | 2002/0083461 A1 | 6/2002 | Hutcheson et al. ............ 725/62 |
| 6,919,824 B2 | 7/2005 | Lee ............. 341/20 | | 2002/0085097 A1 | 7/2002 | Colmenarez et al. ............ 348/211 |
| 6,924,787 B2 | 8/2005 | Kramer et al. ............. 345/156 | | 2002/0094189 A1 | 7/2002 | Navab et al. ............ 386/4 |
| 6,928,180 B2 | 8/2005 | Stam et al. ............. 382/104 | | 2002/0126899 A1 | 9/2002 | Farrell ............ 382/199 |
| 6,930,725 B1 | 8/2005 | Hayashi ............. 348/373 | | 2002/0134151 A1 | 9/2002 | Naruoka et al. ............ 73/291 |
| 6,931,125 B2 | 8/2005 | Smallwood ............. 379/433.07 | | 2002/0158873 A1 | 10/2002 | Williamson ............ 345/427 |
| 6,931,596 B2 | 8/2005 | Gutta et al. ............. 715/728 | | 2003/0014212 A1 | 1/2003 | Ralston et al. ............ 702/150 |
| 6,943,776 B2 | 9/2005 | Ehrenburg ............. 345/168 | | 2003/0022716 A1 | 1/2003 | Park et al. ............ 463/36 |
| 6,945,653 B2 | 9/2005 | Kobori et al. ............. 353/30 | | 2003/0093591 A1 | 5/2003 | Hohl ............ 710/22 |
| 6,947,576 B2 | 9/2005 | Stam et al. ............. 382/104 | | 2003/0100363 A1 | 5/2003 | Ali ............ 436/30 |
| 6,951,515 B2 | 10/2005 | Ohshima et al. ............. 463/31 | | 2003/0123705 A1 | 7/2003 | Stam et al. ............ 382/104 |
| 6,952,198 B2 | 10/2005 | Hansen ............. 345/158 | | 2003/0160862 A1 | 8/2003 | Charlier et al. ............ 348/14.08 |
| 6,965,362 B1 | 11/2005 | Ishizuka ............. 345/82 | | 2003/0232649 A1 | 12/2003 | Gizis et al. ............ 463/40 |
| 6,970,183 B1 | 11/2005 | Monroe ............. 348/143 | | 2004/0001082 A1 | 1/2004 | Said ............ 345/730 |
| 6,990,639 B2 | 1/2006 | Wilson ............. 715/863 | | 2004/0017355 A1 | 1/2004 | Shim ............ 345/157 |
| 7,006,009 B2 | 2/2006 | Newman ............. 340/854.5 | | 2004/0048663 A1 | 3/2004 | Cheng et al. |
| 7,016,411 B2 | 3/2006 | Azuma et al. ............. 375/240.08 | | 2004/0063480 A1 | 4/2004 | Wang ............ 463/8 |
| 7,039,199 B2 | 5/2006 | Rui ............. 381/92 | | 2004/0063481 A1 | 4/2004 | Wang ............ 463/8 |
| 7,039,253 B2 | 5/2006 | Matsuoka et al. ............. 382/295 | | 2004/0070565 A1 | 4/2004 | Nayar et al. ............ 345/156 |
| 7,042,440 B2 | 5/2006 | Pryor et al. ............. 345/158 | | 2004/0087366 A1 | 5/2004 | Shum et al. ............ 463/36 |
| 7,043,056 B2 | 5/2006 | Edwards et al. ............. 382/103 | | 2004/0095327 A1 | 5/2004 | Lo ............ 345/169 |
| 7,054,452 B2 | 5/2006 | Ukita ............. 381/92 | | 2004/0140955 A1 | 7/2004 | Metz ............ 345/166 |
| 7,059,962 B2 | 6/2006 | Watashiba ............. 463/2 | | 2004/0150728 A1 | 8/2004 | Ogino ............ 348/239 |
| 7,061,507 B1 | 6/2006 | Tuomi et al. ............. 345/611 | | 2004/0178576 A1 | 9/2004 | Hillis et al. ............ 273/148 |
| 7,071,914 B1 | 7/2006 | Marks ............. 345/156 | | 2004/0212589 A1 | 10/2004 | Hall et al. ............ 345/156 |
| 7,090,352 B2 | 8/2006 | Kobor et al. ............. 353/30 | | 2004/0213419 A1 | 10/2004 | Varma et al. ............ 381/92 |
| 7,098,891 B1 | 8/2006 | Pryor ............. 345/158 | | 2004/0227725 A1 | 11/2004 | Calarco et al. ............ 345/156 |
| 7,102,615 B2 | 9/2006 | Marks ............. 345/156 | | 2004/0254017 A1 | 12/2004 | Cheng et al. ............ 463/35 |
| 7,106,366 B2 | 9/2006 | Parker et al. ............. 348/222.1 | | 2005/0037844 A1 | 2/2005 | Shum et al. ............ 463/36 |
| 7,116,330 B2 | 10/2006 | Marshall et al. ............. 345/474 | | 2005/0047611 A1 | 3/2005 | Mao ............ 381/94.7 |
| 7,116,342 B2 | 10/2006 | Dengler et al. ............. 345/630 | | 2005/0088369 A1 | 4/2005 | Yoshioka ............ 345/60 |
| 7,121,946 B2 | 10/2006 | Paul et al. ............. 463/36 | | 2005/0102374 A1 | 5/2005 | Moragne et al. ............ 709/217 |
| 7,139,767 B1 | 11/2006 | Taylor et al. ............. 707/102 | | 2005/0105777 A1 | 5/2005 | Koslowski et al. ............ 382/115 |
| 7,148,922 B2 | 12/2006 | Shimada ............. 348/370 | | 2005/0117045 A1 | 6/2005 | Abdellatif et al. ............ 384/335 |
| 7,158,118 B2 | 1/2007 | Liberty ............. 345/158 | | 2005/0198095 A1 | 9/2005 | Du et al. ............ 709/200 |
| 7,161,634 B2 | 1/2007 | Long ............. 384/624 | | 2005/0226431 A1 | 10/2005 | Mao ............ 381/61 |
| 7,164,413 B2 | 1/2007 | Davis et al. ............. 345/163 | | 2005/0239548 A1 | 10/2005 | Ueshima et al. ............ 463/36 |
| 7,183,929 B1 | 2/2007 | Antebi et al. ............. 340/573.1 | | 2006/0033713 A1* | 2/2006 | Pryor ............ 345/158 |
| 7,212,308 B2 | 5/2007 | Morgan ............. 358/1.18 | | 2006/0035710 A1 | 2/2006 | Festejo et al. ............ 463/36 |
| 7,223,173 B2 | 5/2007 | Masuyama et al. ............. 463/36 | | 2006/0038819 A1 | 2/2006 | Festejo et al. ............ 345/530 |
| 7,224,384 B1 | 5/2007 | Iddan et al. ............. 348/207.99 | | 2006/0204012 A1 | 9/2006 | Marks et al. ............ 381/26 |
| 7,227,526 B2 | 6/2007 | Hildreth et al. ............. 345/156 | | 2006/0233389 A1 | 10/2006 | Mao et al. ............ 381/92 |
| 7,227,976 B1 | 6/2007 | Jung et al. ............. 382/103 | | 2006/0252541 A1 | 11/2006 | Zalewski et al. ............ 463/156 |
| 7,239,301 B2 | 7/2007 | Liberty et al. ............. 345/158 | | 2006/0256081 A1 | 11/2006 | Zalewski et al. ............ 345/156 |
| 7,245,273 B2 | 7/2007 | Eberl et al. ............. 351/211 | | 2006/0264258 A1 | 11/2006 | Zalewski et al. ............ 463/36 |
| 7,259,375 B2 | 8/2007 | Tichit et al. ............. 250/341.8 | | 2006/0264259 A1 | 11/2006 | Zalewski et al. ............ 463/36 |
| 7,262,760 B2 | 8/2007 | Liberty ............. 345/156 | | 2006/0264260 A1 | 11/2006 | Zalewski et al. ............ 463/36 |
| 7,263,462 B2 | 8/2007 | Funge et al. ............. 702/179 | | 2006/0269072 A1 | 11/2006 | Mao ............ 381/56 |
| 7,274,305 B1 | 9/2007 | Lutrell ............. 340/870.02 | | 2006/0269073 A1 | 11/2006 | Mao ............ 381/56 |
| 7,277,526 B2 | 10/2007 | Rifkin et al. ............. 345/156 | | 2006/0274032 A1 | 12/2006 | Mao et al. ............ 345/156 |
| 7,283,679 B2 | 10/2007 | Okada et al. ............. 382/260 | | 2006/0274911 A1 | 12/2006 | Mao et al. ............ 381/334 |
| 7,296,007 B1 | 11/2007 | Funge et al. ............. 706/47 | | 2006/0277571 A1* | 12/2006 | Marks et al. ............ 725/37 |
| 7,301,530 B2 | 11/2007 | Lee et al. ............. 345/158 | | 2006/0280312 A1 | 12/2006 | Mao ............ 381/56 |
| 7,305,114 B2 | 12/2007 | Wolff et al. ............. 709/200 | | 2006/0282873 A1 | 12/2006 | Zalewski et al. ............ 725/133 |
| 7,346,387 B1 | 3/2008 | Wachter et al. ............. 600/476 | | 2006/0287084 A1 | 12/2006 | Mao et al. ............ 463/37 |
| 7,352,359 B2 | 4/2008 | Zalewski et al. ............. 345/156 | | 2006/0287085 A1 | 12/2006 | Mao et al. ............ 463/37 |
| 7,364,297 B2 | 4/2008 | Goldfain et al. ............. 351/206 | | 2006/0287086 A1 | 12/2006 | Zalewski et al. ............ 436/37 |
| 7,379,559 B2 | 5/2008 | Wallace et al. ............. 382/100 | | 2006/0287087 A1 | 12/2006 | Zalewski et al. ............ 463/37 |
| 7,391,409 B2 | 6/2008 | Zalewski et al. ............. 345/156 | | 2007/0015559 A1 | 1/2007 | Zalewski et al. ............ 463/1 |
| 7,414,611 B2 | 8/2008 | Liberty ............. 345/158 | | 2007/0021208 A1* | 1/2007 | Mao et al. ............ 463/36 |
| 7,436,887 B2 | 10/2008 | Yeredor et al. ............. 375/240 | | 2007/0025562 A1 | 2/2007 | Zalewski et al. ............ 381/92 |
| 7,446,650 B2 | 11/2008 | Scholfield et al. ............. 340/425.5 | | 2007/0060336 A1* | 3/2007 | Marks et al. ............ 463/30 |
| 7,489,298 B2 | 2/2009 | Liberty ............. 345/158 | | 2007/0061413 A1 | 3/2007 | Larsen et al. ............ 709/217 |
| 7,489,299 B2 | 2/2009 | Liberty et al. ............. 345/163 | | 2007/0066394 A1* | 3/2007 | Ikeda et al. ............ 463/37 |
| 7,545,926 B2 | 6/2009 | Mao ............. 379/406.08 | | 2007/0072675 A1 | 3/2007 | Hammano et al. ............ 463/42 |
| 7,558,698 B2 | 7/2009 | Funge et al. ............. 702/179 | | 2007/0117625 A1* | 5/2007 | Marks et al. ............ 463/30 |
| 7,613,610 B1 | 11/2009 | Zimmerman et al. ............. 704/235 | | 2007/0120834 A1 | 5/2007 | Boillot ............ 354/103 |
| 7,623,115 B2 | 11/2009 | Marks ............. 345/156 | | 2007/0120996 A1 | 5/2007 | Boillot ............ 384/345 |
| 7,627,139 B2 | 12/2009 | Marks et al. ............. 382/103 | | 2007/0260340 A1 | 11/2007 | Mao ............ 700/94 |
| 7,636,645 B1 | 12/2009 | Yen et al. ............. 702/152 | | 2007/0260517 A1 | 11/2007 | Zalewski et al. ............ 705/14 |
| 7,636,697 B2 | 12/2009 | Dobson et al. ............. 706/12 | | 2007/0261077 A1 | 11/2007 | Zalewski et al. ............ 725/35 |
| 7,636,701 B2 | 12/2009 | Funge et al. ............. 706/47 | | 2008/0056561 A1 | 3/2008 | Sawachi ............ 382/154 |
| 7,697,700 B2 | 4/2010 | Mao ............. 381/94.3 | | 2008/0070684 A1 | 3/2008 | Haigh-Hutchinson ............ 463/32 |
| 7,721,231 B2 | 5/2010 | Wilson ............. 715/863 | | 2008/0091421 A1 | 4/2008 | Gustavsson ............ 704/233 |
| 2001/0056477 A1 | 12/2001 | McTernan et al. ............. 709/219 | | 2008/0261693 A1 | 10/2008 | Zalewski ............ 463/31 |
| 2002/0010655 A1 | 1/2002 | Kjallstrom ............. 705/27 | | 2008/0311990 A1 | 12/2008 | Chiu et al. |
| 2002/0056114 A1 | 5/2002 | Fillebrown et al. ............. 725/78 | | 2009/0009471 A1 | 1/2009 | Yamamoto et al. |
| 2002/0072414 A1 | 6/2002 | Stylinski et al. ............. 463/42 | | 2009/0010494 A1 | 1/2009 | Bechtel et al. ............ 382/104 |

| | | | |
|---|---|---|---|
| 2009/0016642 | A1 | 1/2009 | Hart .............................. 382/278 |
| 2009/0221368 | A1 | 9/2009 | Yen et al. ........................ 463/32 |
| 2009/0221374 | A1 | 9/2009 | Yen et al. ........................ 463/42 |
| 2009/0288064 | A1 | 11/2009 | Yen et al. ...................... 717/106 |
| 2010/0004896 | A1 | 1/2010 | Yen et al. ...................... 702/153 |
| 2010/0137064 | A1 | 6/2010 | Shum et al. ..................... 463/36 |

FOREIGN PATENT DOCUMENTS

| | | |
|---|---|---|
| EP | 0652686 | 5/1995 |
| EP | 0750202 | 12/1996 |
| EP | 0835676 | 4/1998 |
| EP | 1098686 | 5/2003 |
| EP | 1435258 | 7/2004 |
| FR | 2814965 | 4/2002 |
| GB | 2206716 | 11/1989 |
| GB | 2376397 | 11/2002 |
| GB | 2388418 | 11/2003 |
| JP | 1284897 | 11/1989 |
| JP | 6102980 | 4/1994 |
| JP | 07-311568 | 11/1995 |
| JP | 9128141 | 5/1997 |
| JP | 9185456 | 7/1997 |
| JP | 1138949 | 2/1999 |
| JP | 2000-172431 | 6/2000 |
| JP | 2000259856 | 9/2000 |
| JP | 2000350859 | 12/2000 |
| JP | 2001-166676 | 6/2001 |
| JP | 2002369969 | 12/2002 |
| JP | 2004-145448 | 5/2004 |
| JP | 2005-046422 | 2/2005 |
| TW | 588258 | 5/2004 |
| TW | 200708328 A | 3/2007 |
| TW | 200846060 A | 12/2008 |
| TW | 200910164 A | 3/2009 |
| WO | WO 88/05942 | 8/1988 |
| WO | WO 98/48571 | 10/1998 |
| WO | WO 99/35633 | 7/1999 |
| WO | WO 99/26198 | 10/1999 |
| WO | WO 02/27456 | 2/2002 |
| WO | WO 03/079179 | 9/2003 |
| WO | WO 2005/073838 | 8/2005 |
| WO | WO 2005107911 | 11/2005 |
| WO | WO 2007095082 | 8/2007 |
| WO | WO 2008/056180 | 5/2008 |

OTHER PUBLICATIONS

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Bolt, R.A., "Put-that-there": voice and gesture at the graphics interface,Computer Graphics, vol. 14, No. 3 (ACM SIGGRAPH Conference Proceedings) Jul. 1980, pp. 262-270.

DeWitt, Thomas and Edelstein, Phil "Pantomation: A System for Position Tracking", Proceedings of the $2^{nd}$ Symposium on Small Computers in the Arts, Oct. 1982, pp. 61-69.

Kanade, et al., "A Stereo Machine for Video-rate Dense Depth Mapping and Its New Application" 1996, CVPR 96, IEEE Computer Society Conference, pp. 196-202.

Gvili, et al., "Depth Keying", SPIE vol. 5006 (2003), 2003 SPIE-IS &T, pp. 564-574.

Ephraim et al. "Speech Enhancement Using a Minimum Mean -Square Error Log-Spectral Amplitude Estimator", 1985, IEEE.

Ephraim et al. "Speech Enhancement Using a Minimum Mean -Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

* cited by examiner

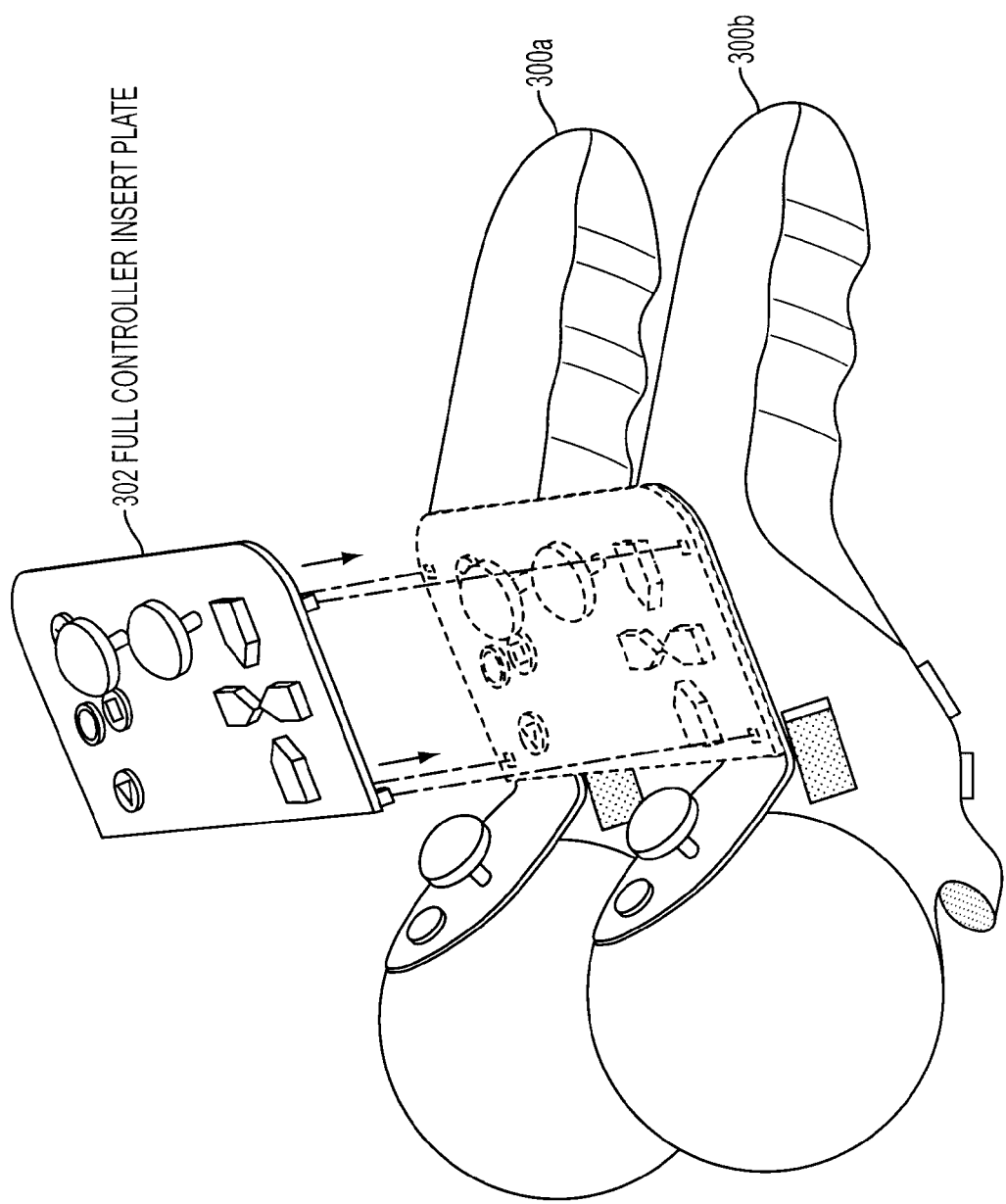

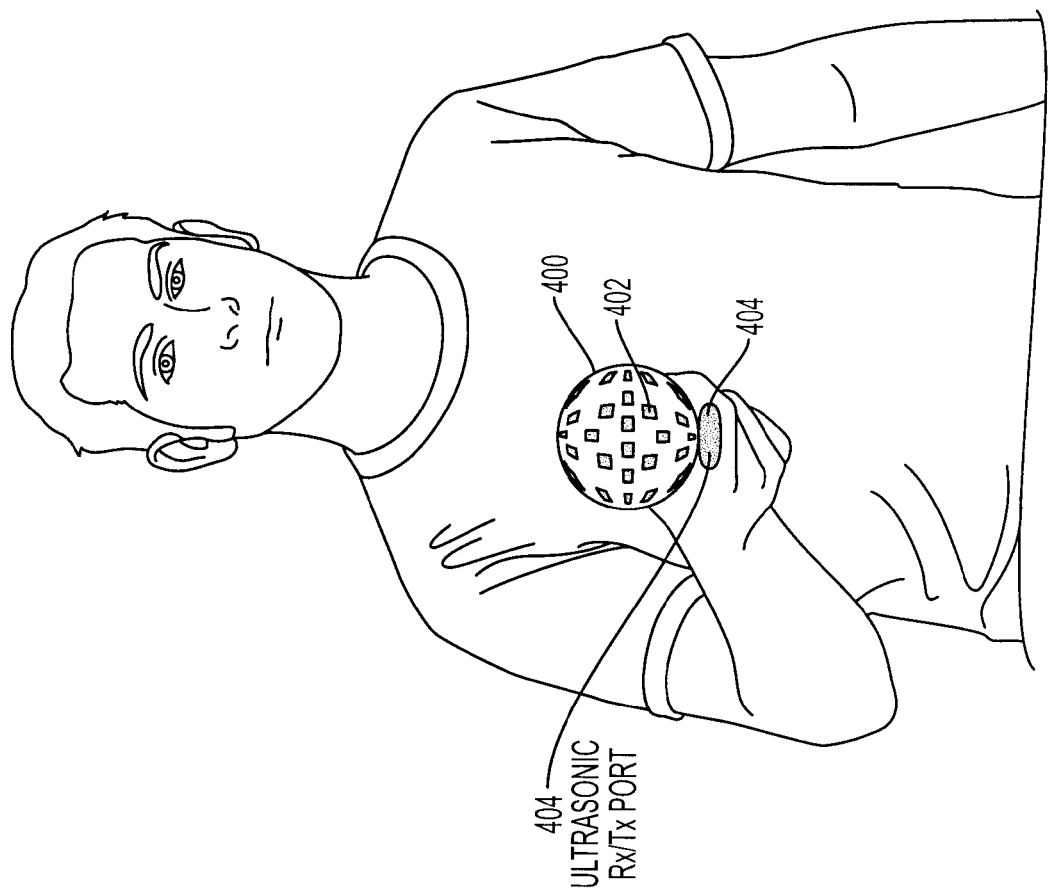

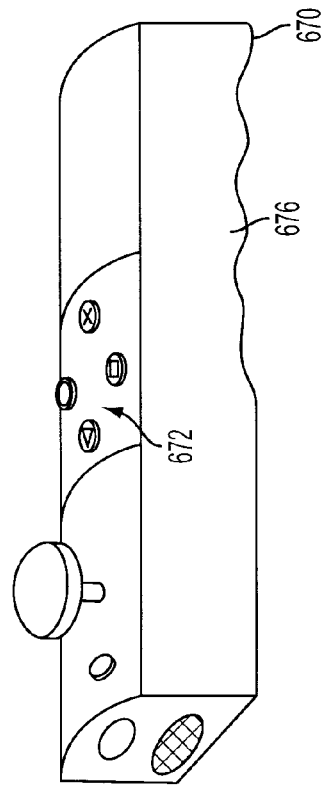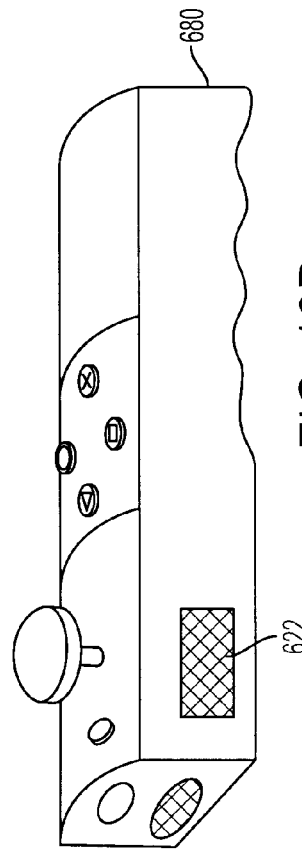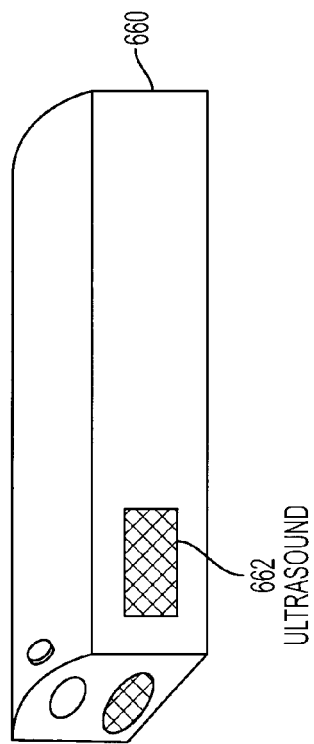
FIG. 19A
FIG. 19B
FIG. 19C
FIG. 19D

DETERMINATION OF CONTROLLER THREE-DIMENSIONAL LOCATION USING IMAGE ANALYSIS AND ULTRASONIC COMMUNICATION

CLAIM OF PRIORITY

This application claims priority from U.S. Provisional Patent Application No. 61/057,783, filed May 30, 2008, and entitled "DETERMINATION OF CONTROLLER THREE-DIMENSIONAL LOCATION USING IMAGE ANALYSIS AND ULTRASONIC COMMUNICATION." This provisional application is herein incorporated by reference.

CROSS REFERENCE TO RELATED APPLICATIONS

This application is related to U.S. patent application Ser. No. 11/588,779, filed Oct. 26, 2006, and entitled "System and method for interfacing with a computer program"; and U.S. application Ser. No. 11/429,414, filed on May 4, 2006, and entitled "Computer image and audio processing of intensity and input devices for interfacing with a computer program", which are incorporated herein by reference.

BACKGROUND

1. Field of the Invention

The present invention relates generally to communications between a computing device and a controller held in a hand of a user, and more specifically to using the communications between the computing device and the controller to determine the location of the controller in a three-dimensional space.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

However, current object tracking suffers in capture accuracy. This problem arises because conventional image analysis can only produce somewhat reliable measurements of the location of the user in two dimensions. Determining the distance between the camera and the object being tracked is difficult, as the slight changes in shape due to movement towards or away from the camera do not provide enough information to reliably calculate distances between the camera and the controller. In laboratory settings, some have utilized a depth sensing device. However, these depth sensing devices rely on two-way bounce back, which attempt to outline the contours of certain images from light that is reflected off of objects placed in front of such devices. Although such devices have certain applications, their application to gaming is somewhat limited, due to expense, complexity and extra processing required to combine depth data with two-dimensional image data. Consequently, depth data integration with interactive game controllers has continued to lag, produced less than desired results, and has not been widely accepted outside of the laboratory.

It is within this context that embodiments of the invention arise.

SUMMARY

Broadly speaking, the present invention fills these needs by providing methods and systems for establishing communication between a computer program in a computing system and a controller to be held by a user in order to determine the three-dimensional location of the controller. It should be appreciated that the present invention can be implemented in numerous ways, such as a process, an apparatus, a system, a device or a method on a computer readable medium. Several inventive embodiments of the present invention are described below.

In one embodiment, a method for establishing communication between a computer program in a computing system and a controller held in a hand of a user is provided. The method displays a graphical user interface on a display and captures image data of an area in front of the display. The area in front of the display is also known as the capture area and encompasses the space where a user interacting with the computing system is expected. Adjustment to the capture area can also be made, so as to reduce or enlarge the area. The captured image data, such as data provided by a digital video camera, is used to identify the two-dimensional location of the controller with respect to the capture area. The method also captures one-way sound communication between a location proximate to the display, such as a microphone, and a location at the controller. The information obtained via the sound communication is used to compute a third-dimensional location of the controller within the capture area.

Another embodiment describes a system for establishing communication between a computer program and a controller. The system includes a display for rendering a graphical user interface, an image capture device, a sound capture device, and a computing system for executing the computer program. The image capture device captures image data in an area in front of the display, which is referred to herein as the capture area. The sound capture device similarly captures sound data in the capture area. The computing system is connected to the display, to the image capture device, and to the sound capture device. The controller is configured to be held by a user with a single hand and includes a body with a first end and a second end; a grip area at about the first end; an input pad between the two ends for entering input data; a spherical-type section at the second end; and a sound emitting device near the second end. The spherical-type section facilitates image recognition by the image capture device, and the sound emitting device, which is directed away from the user when held, provides for one-way sound communication with the sound capture device. The computer program identifies a two-dimensional location of the controller based on the captured image data and a third-dimensional location of the controller based on the captured sound data.

Further, in another embodiment a system for establishing communication between a computer program and a controller is provided. The system includes a display, two sets of light emitters located near the display and facing a capture area in front of the display, a sound capture device such as a microphone, and a computing system for executing the computer program. The computing system is connected to the display and to the sound capture device. In the system, the controller is to be held by a user with a single hand and the controller includes a body with a first end and a second end, a grip area at about the first end, an input pad between the first and the second end, an image capture device near the second end, and a sound emitting device near the second end. The sound emitting device is directed away from the user when held and is configured for one-way sound communication with the sound capture device near the computing system. Within this system, the computer program identifies a two-dimensional location of the controller based on the captured image data and a third-dimensional location of the controller based on the captured sound data.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 8 shows a schematic representation of two single-hand controllers joined together by an insert plate to form a controller intended to be used with two hands, according to one embodiment.

FIGS. 12A-12B show different views of a single-hand controller held by a player.

FIGS. 19A-19D shows different embodiments of single-hand controllers with video and ultrasound capabilities.

DETAILED DESCRIPTION

Figure 1:
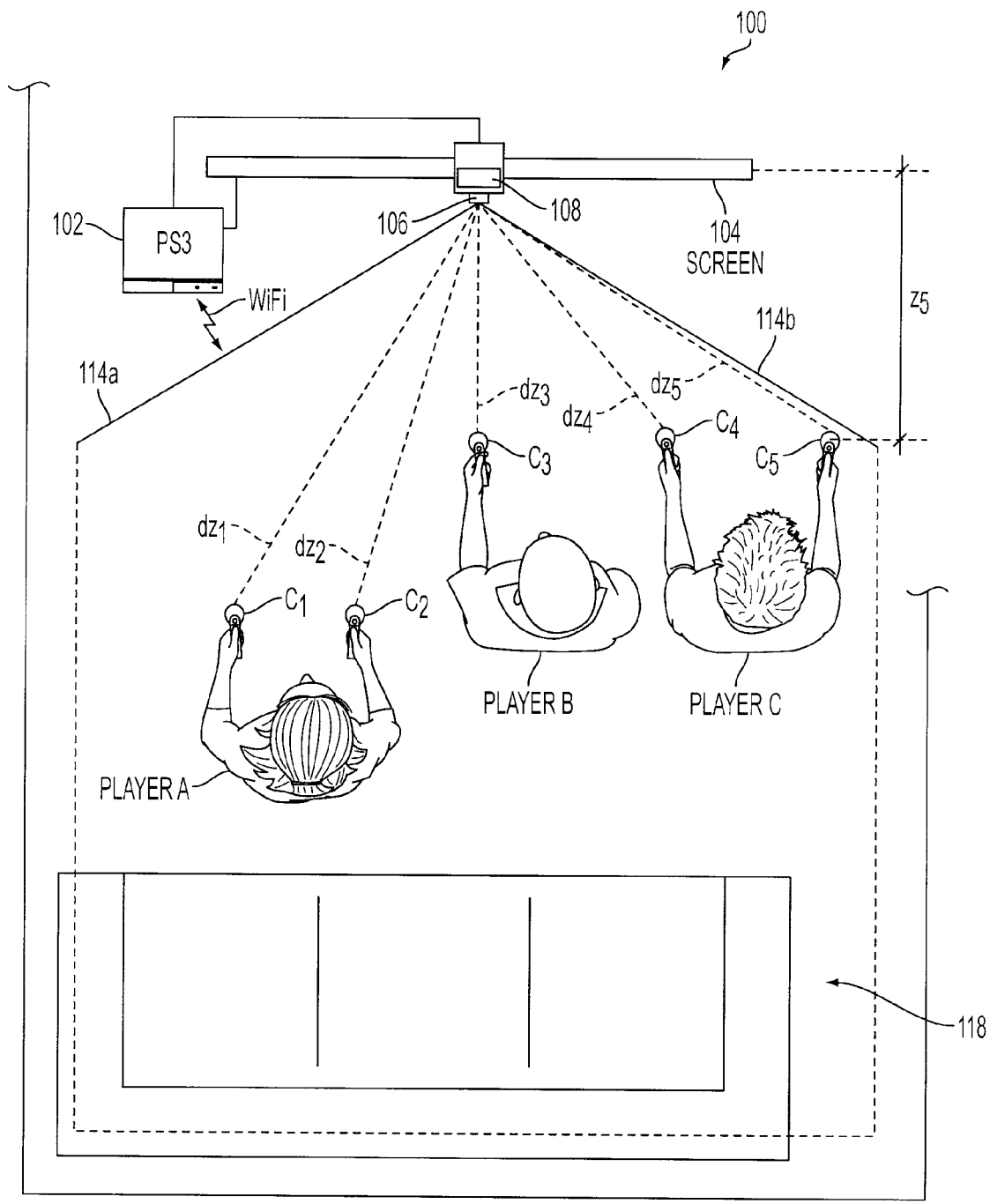
FIG. 1 shows an interactive playing environment with multiple players.

Methods and systems for establishing communication between a computer program in a computing system and a controller held in a hand of a user are provided, in order to determine a three-dimensional location of a controller held by a user. The method displays a graphical user interface on a display and then captures image data from a capture area located in front of the display where a user interacting with the computing system is expected to reside. The captured image data is used to identify a two-dimensional location of the controller in the capture area. The two-dimensional location describes the horizontal and vertical position of the controller. Additionally, the method uses one-way sound communication between a location proximate to the display and a location at the controller to capture sound data. The sound data is used to compute the distance from the controller to the display area. The two-dimensional location and the distance combined define a point in the capture area where the controller is located.

As used herein, one-way sound communication refers to transmitting information from a sender to a receiver using sound waves. In some embodiments, the sound waves are ultrasonic waves, therefore not audible by humans. In some embodiments, the sender corresponds to a first end of the sound communication, and the receiver corresponds to a second end. In other embodiments, the roles are reversed where the first end corresponds to the receiver and the second end corresponds to the sender. Still yet, some embodiments include two-way, or bi-directional, communications between the first end and the second end, where at any time the first end or the second end can act as a sender or a receiver.

The sound communication is used to assess a distance from one end to the other end by examining information associated with the sound communication. For example, the sender sends a sound pulse to the receiver and the time for the sound signal to travel from one end to the other is measured in order to check the distance based on the speed of sound. In one embodiment, it should be noted that the sender and the receiver correspond to different entities and not to the same entity, or in other words, the time it takes for a signal to return to the sender is not being considered for the methods and apparatus described herein. Other operations, besides the use of a sound pulse, can be used in conjunction with the sound communication, as long as a measurement of the distance from sender to receiver is obtained. Example of other operations are, analyzing phase coherence, changing the phase of the wave signal, changing the frequency of the wave signal, changing the amplitude of the wave signal, etc.

It will be obvious, however, to one skilled in the art, that the present invention may be practiced without some or all of these specific details. In other instances, well known process operations have not been described in detail in order not to unnecessarily obscure the present invention.

FIG. 1 shows an interactive playing environment with multiple players. Entertainment system 100 includes computing system 102 running a computer program that includes instructions for communication with controllers $C_1$-$C_5$ being held by players A, B, and C. Computing system 100 is in communication with image capture device 106, sound capture device 108, display 104, and controllers $C_1$-$C_5$. Computing system 100 communicates with the other entities in entertainment system 100 via direct wired connections or via wireless communications which can include Bluetooth®, Wi-Fi™, 802.11, etc. A typical configuration includes direct wired connections between computing system 102 and the fixed elements near the computing system such as image capture device 106, display 104, and sound capture device 108, while communications to the controllers are wireless using WiFi™. Although WiFi™ is specifically referred, it should be understood that other communication standards may also be used, including non-standard wireless communication protocols and algorithms.

Capture area 118 is a three dimensional space where users of the system are expected to be while interacting with entertainment system 100. Image capture device 106 takes images of the capture area and sends them to computing system 102. In one embodiment, image capture device 106 is a digital video camera. Other embodiments use other types of image capture devices, such as a color digital camera, a black and white digital camera, an infrared camera, or specialized devices that focus on detection of particular characteristics of the objects being detected, such as a predetermined color.

The captured image data can be manipulated and analyzed in a compressed format or in a raw format. The raw image format contains minimally processed data from the image capture device. The processed or compressed image data is created by a raw converter with a wide-gamut internal colorspace to make precise adjustments before conversion to an red-green-blue (RGB) file format such as Tagged Image File Format (TIFF), Joint Photographic Experts Group (JPEG), Portable Network Graphics (PNG), Graphics Interchange Format (GIF), Windows bitmap file format (BMP), etc. The color depth of the processed image can vary from black and white, to grayscale, to a web-palette, to 24-bit per pixel, etc. In one embodiment, the raw image data is analyzed to locate the shape of the controller within the image data, and a controller location is then assigned corresponding to the located shape in the image data. In another embodiment, the processed image data is used instead to locate the controller within the captured image.

The captured image data is used to determine a two dimensional location of the controller. This location is identified by two coordinates x and y, (x, y), that define a point in a plane, or a line in a three-dimensional space such as the capture area. Sometimes horizontal and vertical positions are used to refer to the x and y values. Additionally, other types of coordinates are used, such as an angle from origin and a vector value. Similarly within a three-dimensional space different systems of coordinates can be used to identify a point in space, such as x, y and z orthogonal coordinates, x and y coordinates plus a vector from origin, or two angles and a vector, etc.

Sound capture device 108 takes sound data from the capture area. In one embodiment, one-way communication is used where the sound originating in the controllers is received by sound capture device 108. Ultrasonic communications avoid interfering with the player's experience. In one embodiment, the controllers include a speaker where the sound originates, and the sound capture device includes a receiving microphone focused in the capture area. In one embodiment, the focus on the capture area can be refined using filtering techniques to avoid capture of extraneous noises from outside the capture area. Additionally, the sound capture device may filter frequencies not used in the ultrasonic communication to further reduce interferences from undesired sound sources. Still yet, sounds communications may have false readings due to the sound being reflected from surfaces near the playing area. In one embodiment, computing system 102 includes mechanisms to avoid false readings caused by sound reflections, such as directional filters, sound wave analysis, etc.

In another embodiment, the communication between controller and image capture device 106 is bi-directional, where either the controller or the sound device transmit or receive ultrasonic messages. Still yet, in another embodiment, the one-way communication flows in the opposite direction with an ultrasonic microphone in each controller and a sound emitting device located near the display.

The ultrasonic communication is used to measure the distance between the controller and the sound capture device, named $d_z$, by analyzing the time for the sound signal to reach its destination. Additionally, the phase coherence of the received signal can also be analyzed to better determine distance. When one-way ultrasound communication is used, precise clock synchronization is needed in order to perform accurate measurements of the time for the sound to travel from source to destination. The person skilled in the art will easily appreciate known ways of obtaining clock synchronization. For example, a WiFi™ channel between the controller and the computing device can be used to synchronize the clocks. U.S. Pat. No. 5,991,693 to Zalewski (incorporated herein by reference) provides a tracking mode utilized by the present invention.

The point (x,y) obtained based on the captured image data, together with the distance $d_z$ define a single point within the three-dimensional capture area. Sometimes $d_z$ is called the third dimension, as $d_z$ can be translated into a value within a z axis that is orthogonal to the x, and y axes previously described. The z measurement is referred to as the depth within the capture area. For example, $d_{z5}$ corresponds to the depth value of $z_5$. This geometric conversion is described below with more detail with respect to FIG. 2D.

In one embodiment, capture area 118 is defined by capture area boundaries 114a and 114b defined from image capture device 106, and a back line at a predetermined depth of field. Typical values for the maximum depth range between 3 and 10 feet, but other values are also possible. In other embodiments, the capture area does not have to be pyramidal and can be in the shape of a cube, a sphere, a cone, or any other shape, as long as the principles of the invention are maintained.

Figure 2A:
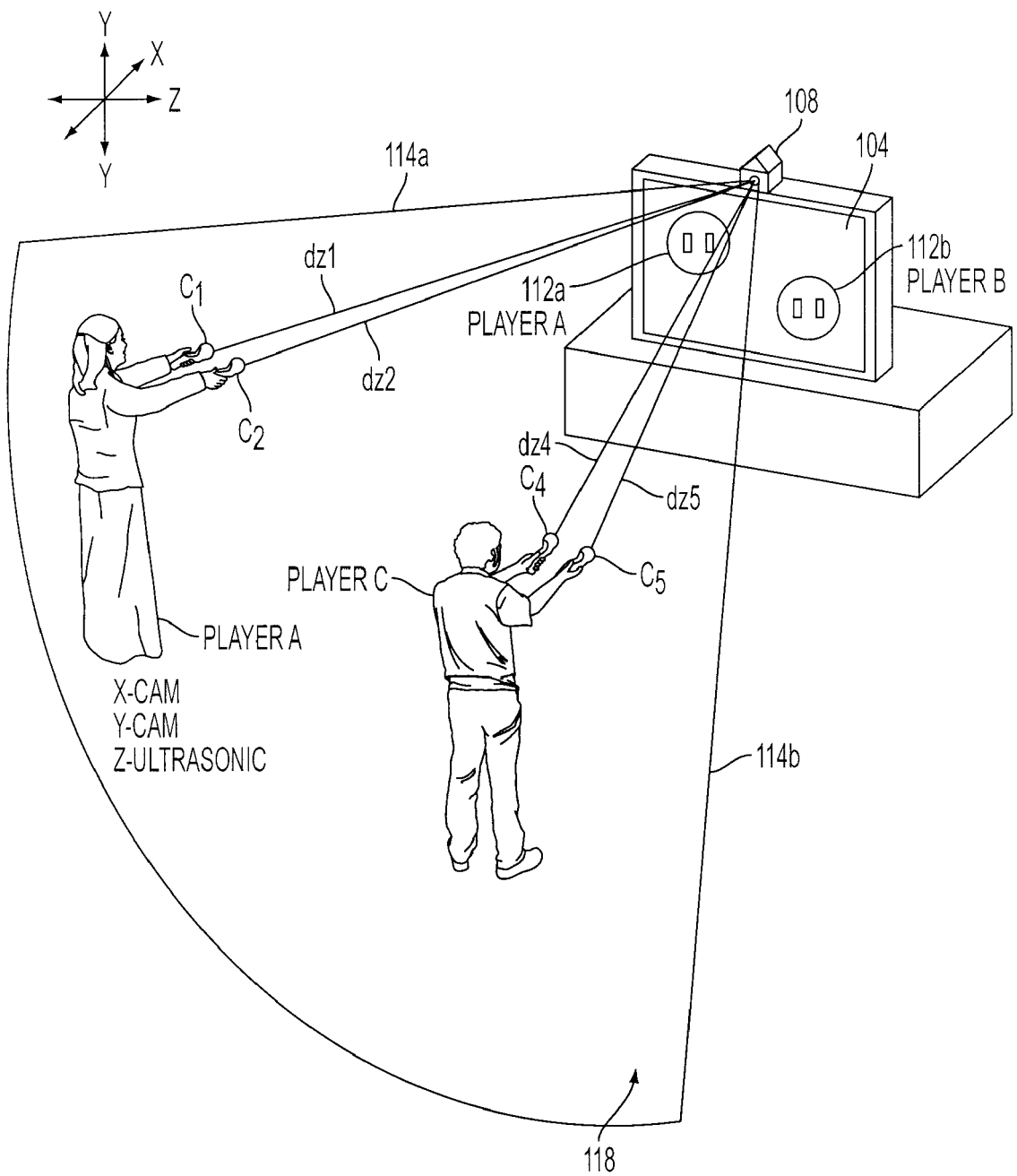
FIGS. 2A-2D show schematic diagrams of a multiplayer environment and the use of video and sound data to determine the locations of the different controllers held by the players according to one embodiment.

FIGS. 2A-2D show schematic diagrams of a multiplayer environment and the use of video and sound data to determine the locations of the different controllers held by the players, according to one embodiment. FIG. 2A depicts a three dimensional view of the playing environment with two players. Image capture device is used to obtain the x and y coordinates of controllers $C_1$, $C_2$, $C_4$ and $C_5$. Distances $d_{z1}$, $d_{z2}$, $d_{z4}$, and $d_{z5}$ are calculated using ultrasound communications received by sound capture device 108. Computing system 102, as seen in FIG. 1, uses the obtained coordinates and distances to produce representations of the players in the screen, avatars 112a and 112b respectively.

Figures 2B, 2C:
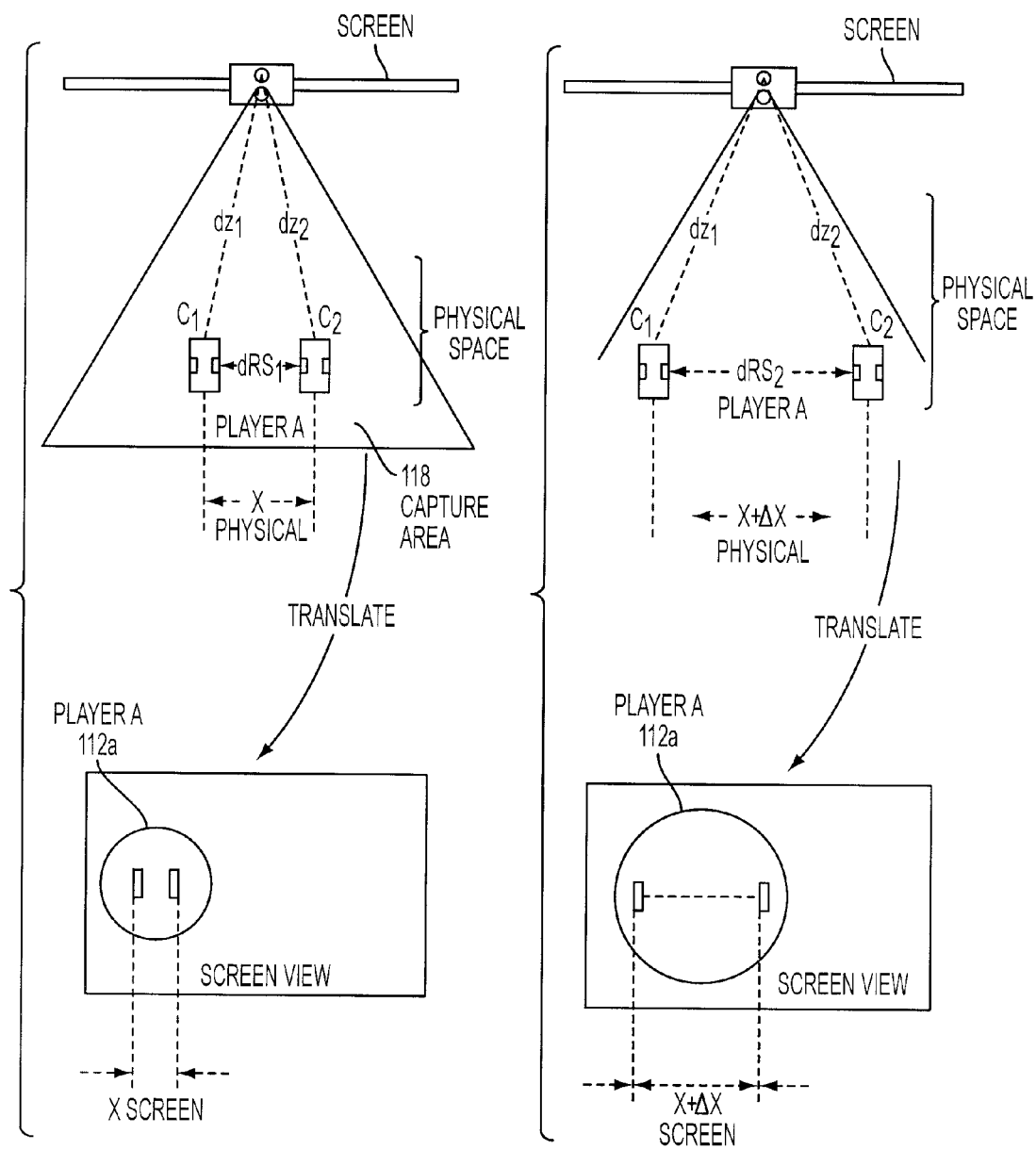

FIG. 2B provides a top level view of the playing environment corresponding to Player A from FIG. 2A. Capture area 118 defines the boundaries for controller detection. In one embodiment, controllers $C_1$ and $C_2$ are configured for two-way ultrasonic communication, thereby enabling the controllers to measure the distance between them, $d_{RS1}$. The controllers are configured with sound interfaces on the sides of the controllers to enable inter-controller communication. In one embodiment, distance $d_{RS1}$ corresponds to an X Physical value, which is translated to an X Screen distance captured on the display. In one embodiment, the vertical component is not considered for the representation of avatar 112a in the screen. In another embodiment, both the x and the y components are calculated from $d_{RS1}$ where the screen representation includes a perspective view of a 3-D playing field (not shown).

FIG. 2C shows the same player as in FIG. 2B at a different point in time where controllers $C_1$ and $C_2$ are separated by a distance $d_{RS2}$, where $d_{RS2}$ is greater than $d_{RS1}$ from FIG. 2B. Distance $d_{RS2}$ corresponds to a new horizontal separation of $(x+\Delta x)$. The new $(x+\Delta x)$ translates to a new relative position of the controllers in the display that has changed by a proportional amount, $(x+\Delta x$ screen).

Figure 2D:
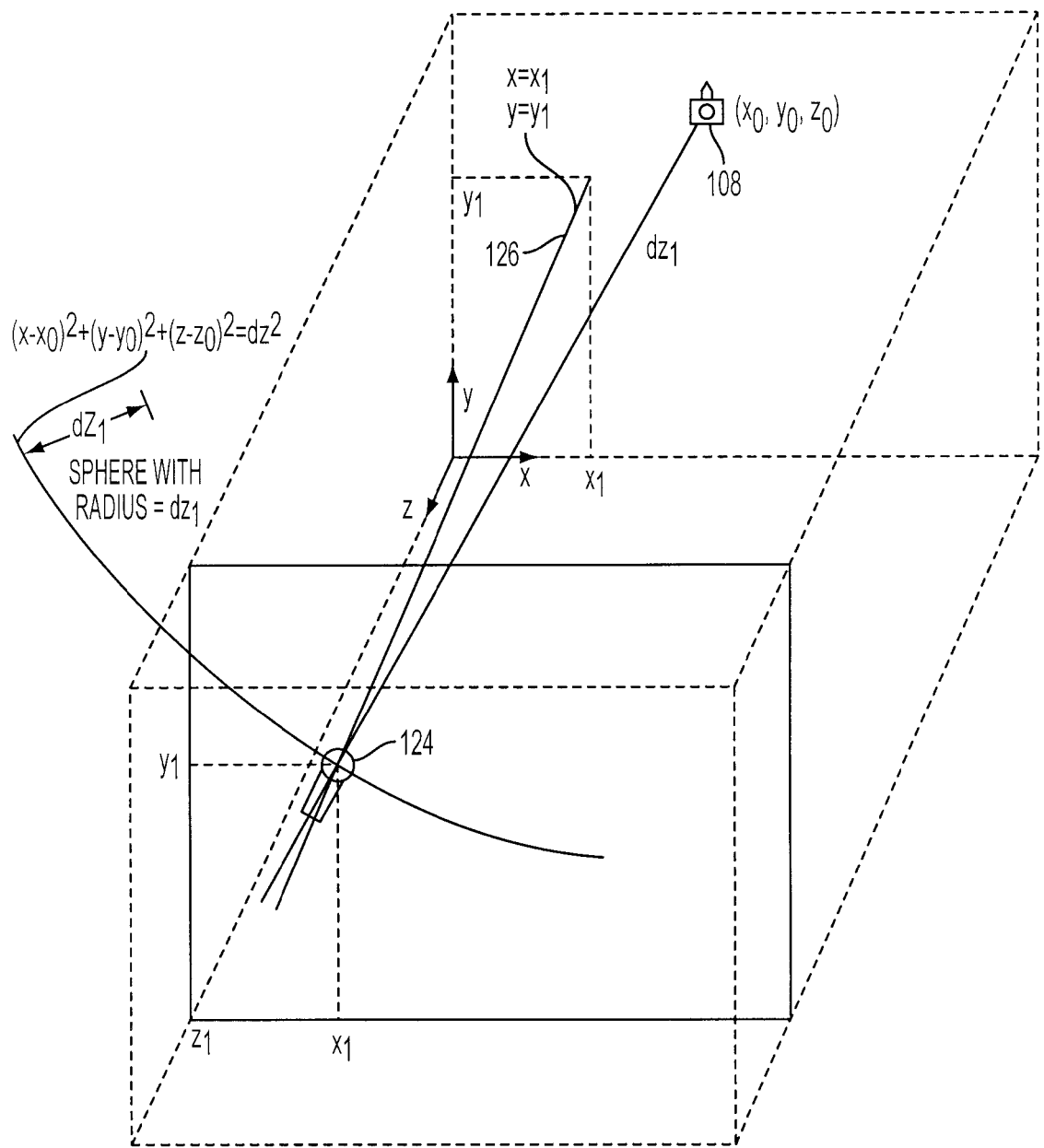

FIG. 2D shows the conversion from a distance measurement to an absolute depth (z) measurement. $d_z$ is the distance from controller 124 to sound capture device 108 with coordinates $(x_0, y_0, z_0)$. Using image capture data, the horizontal $(x_1)$ and vertical $(y_1)$ coordinates of controller 124 are calculated (not shown). Calculating the z, value of controller 124 involves intersecting the line defined by any point with coordinates $(x_1, y_1)$ in the three dimensional space with a sphere centered at the sound capture device and with radius $d_{z1}$. The line is defined by the equation statement $$\{x=x_1; y=y_1\}$$

This equation assumes a space without perspective distortion. Other embodiments compensate for possible distortion due to the perspective view from the image capture device. The sphere is defined by the equation $$(x-x_0)^2+(y-y_0)^2+(z-z_0)^2=d_{z1}^2$$

Substituting x for $x_1$ and y for $y_1$ in the sphere equation returns a z value corresponding to the depth value $z_1$. It should be noted that the equation would return two z values, but only one would be inside the capture area.

Figure 3A:
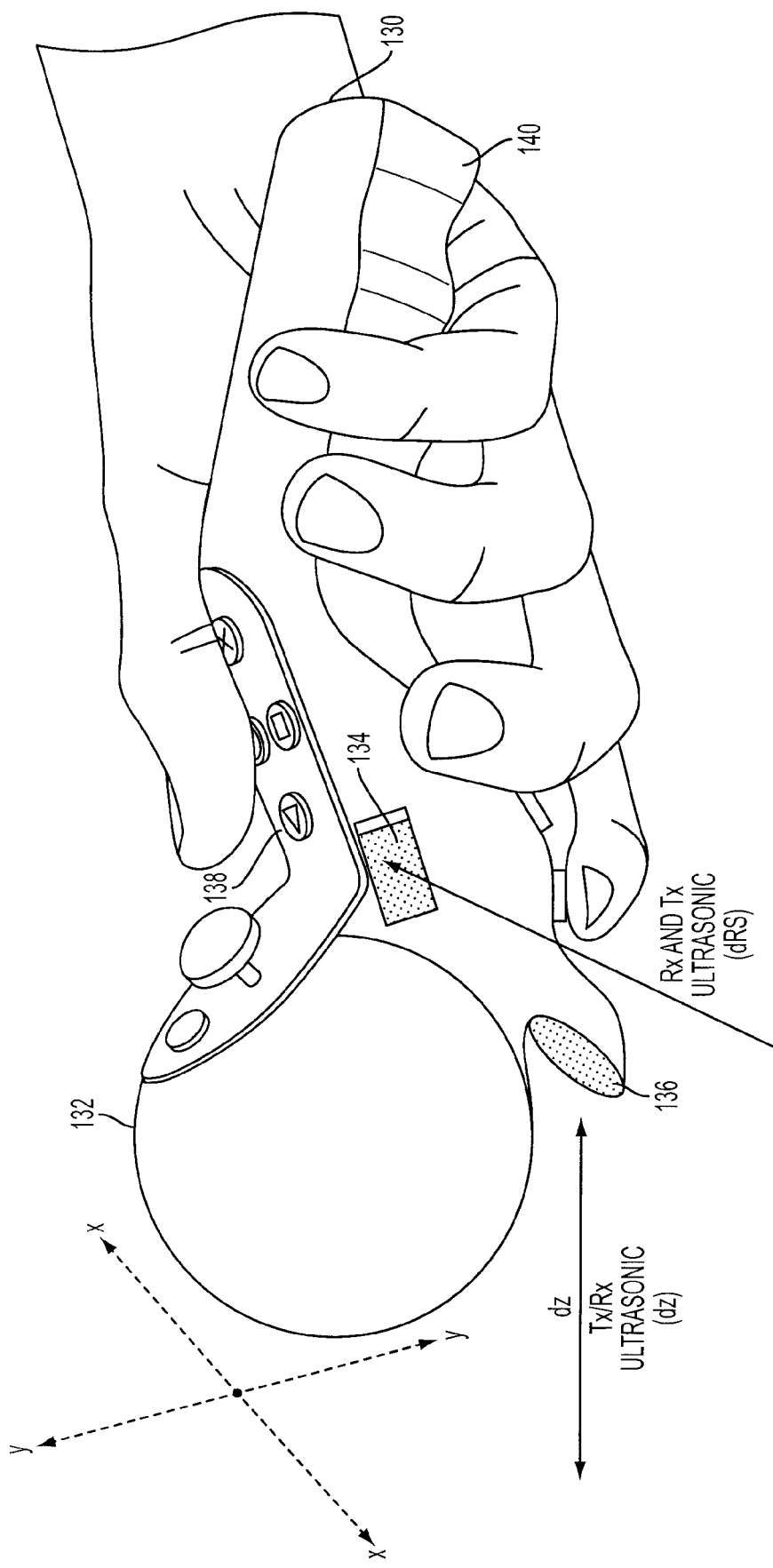
FIGS. 3A-3B describe an embodiment of a single-hand controller with a spherical section and ultrasonic capabilities.
Figure 3B:
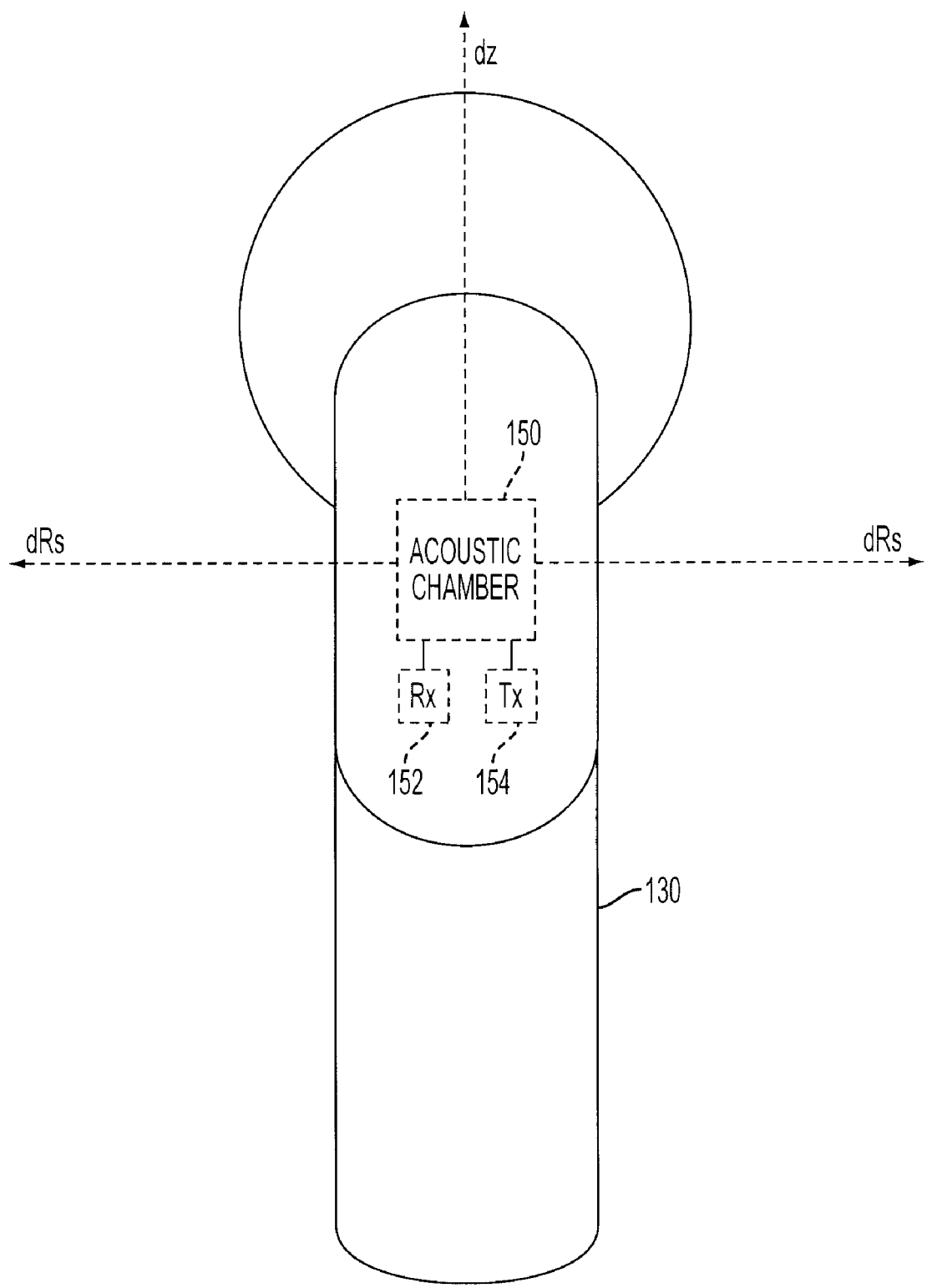

FIGS. 3A-3B describe an embodiment of a single-hand controller 130 with a spherical section 132 and ultrasonic capabilities. The spherical shape of spherical section 132 allows for detection of the controller position by analyzing the image captured by an image capture device.

It should be understood, that as used herein, the term "spherical" is not limited to a perfect sphere. To the contrary, the term "spherical" should also include any shape that has a similar appearance, such as an oval, a partial spherical side, an elliptical shape, a globe shape, a ball shape, a balloon shape, a bulging shape, a protruded shape, an enlarged shape, an extended shape, etc., or any type shape that is easily detected and is made part of, is connected to, or joined with a handheld controller, or simply a basic physical object.

In other embodiments, as described hereinbelow, additional features are added to the spherical section to enable better detection of the controller using image data. Controller 130 is configured for two-way ultrasound communications. Sound interface 136 provides for ultrasound communications toward the front of the controller, and sound interface 134 provides for sound communications toward the sides of the controller. As previously described, the frontal communication is used to determine distance dz from the controller to the sound receiver on the other end.

Sound interface 134 is used to communicate with a second controller being held in another hand of the same player holding controller 130. Lateral sound communications are also used to communicate with other controllers being held by different players, thereby increasing the accuracy in determining the locations of the different players and controllers. In one embodiment, an acoustic chamber inside the controller provides conduit for the sound as described below with respect to FIG. 3B. In another embodiment, sound interface 134 includes a sliding door that closes sound interface 136 when lateral communications are not required, thereby improving the power of the sound communication towards the front of the controller. Input pad area 138 includes buttons for obtaining user inputs during game playing. Controller 130 includes a grip area 140 to accommodate the user's hand.

FIG. 3B depicts controller 130, as seen in FIG. 3A, with an internal acoustic chamber 150. An internal acoustic chamber routes ultrasounds to and from sound emitter 154 and sound receiver 152 towards the outside of the controller. In one embodiment, acoustic chamber 150 has sound interfaces at the front and at the sides. Using the acoustic chamber allows multidirectional sound communications using only one emitter and one receiver. In another embodiment, an acoustic chamber is not used and a pair of emitter and receiver is placed at each side of the controller where sound communications takes place. In another embodiment, the sound communication may pass through the spherical section, whereby the sound is dispersed in multiple directions allowing sound communications even when the controller is not exactly facing the sound capture device at the other end. A plurality of sound interfaces are spread throughout the spherical section, each sound interface connected to the acoustic chamber. The sound interfaces can also include sound sensors that help identifying the direction or sound interface where the sound came through, resulting in improved accuracy.

Figure 4:
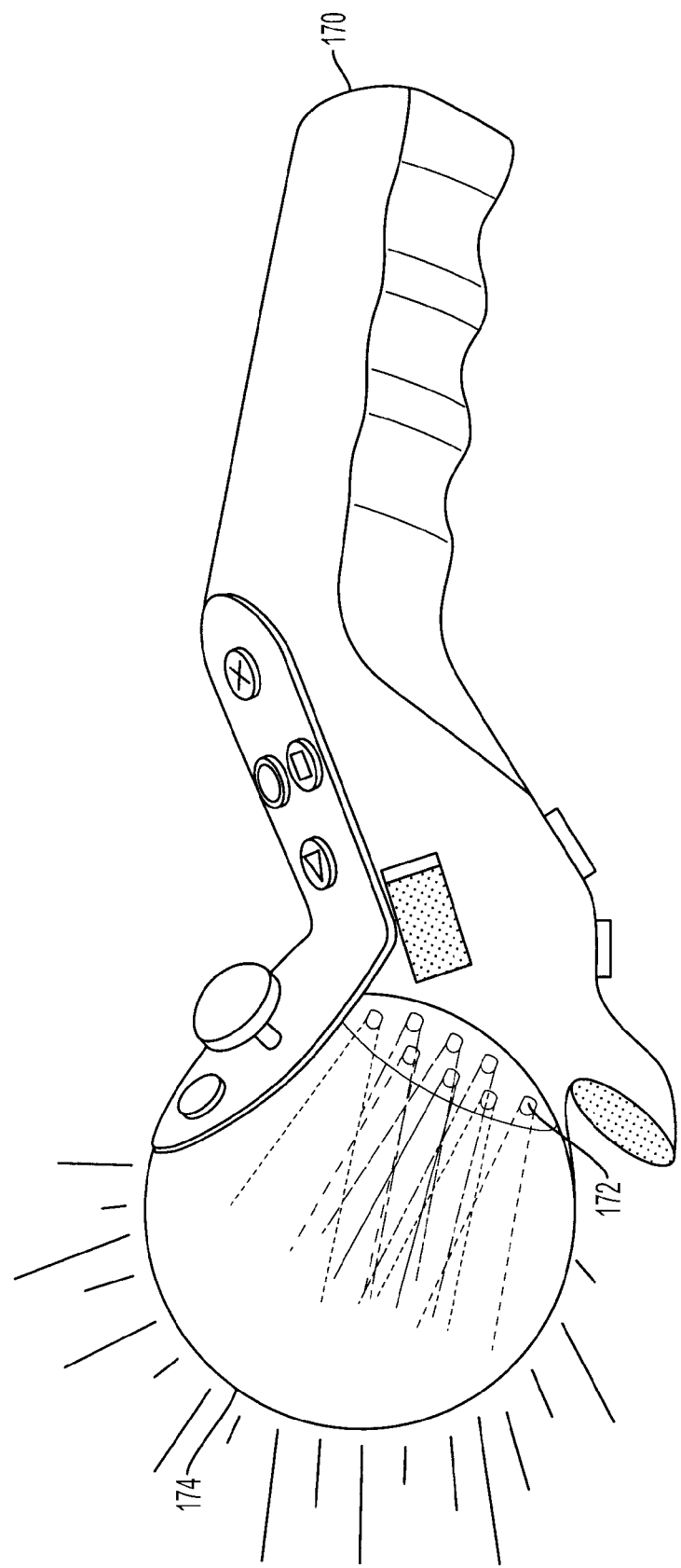
FIG. 4 shows a schematic representation of a controller with a spherical section illuminated by one or more internal light emitters according to one embodiment.

FIG. 4 shows a schematic representation of controller 170 with a spherical section illuminated by one or more internal light emitters 172 according to one embodiment. The light from light emitters 172 illuminates spherical section 174 facilitating the detection of the controller when performing image data analysis, as the extra brightness of the spherical section is used by the computing device to distinguish with more ease the details and contours of the spherical section against background images. In one embodiment, light emitters 172 are light-emitting diodes (LED). In another embodiment, light emitters 172 are in the infrared spectrum making the spherical section glow with infrared light, making detection by an infrared camera possible.

While it is preferred that the camera tracking controller operates at IR frequencies (or has the ability to switch to IR mode), the spherical section of the controller may also be colored bright neon orange or neon green to enable a camera operating in the visible spectrum to track x,y position.

Figure 5:
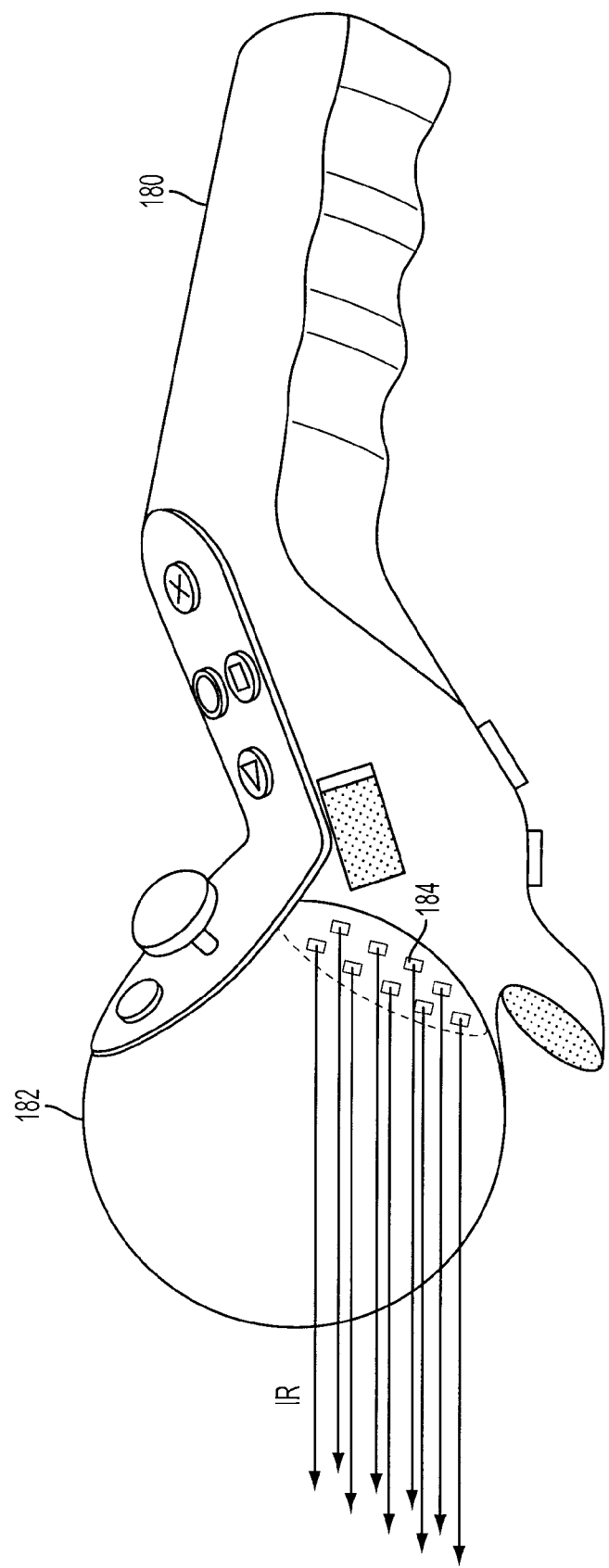
FIG. 5 includes a controller with light emitters inside a spherical section, wherein the light emitters are visible from the outside of the controller, according to one embodiment.

FIG. 5 includes a controller with infrared light emitters 184 inside spherical section 182, wherein the light emitters are visible from the outside of the controller, according to one embodiment. Spherical section lets the infrared light pass through with minimal distortion, enabling an infrared camera to detect the location of controller 180 by detecting the infrared lights. In another embodiment, the light sources are LED's operating in the visible spectrum, which are detected by analyzing image data in the visible spectrum taken with a digital camera. In yet another embodiment, light source frequencies are mixed so visible and IR output is achieved.

Figure 6:
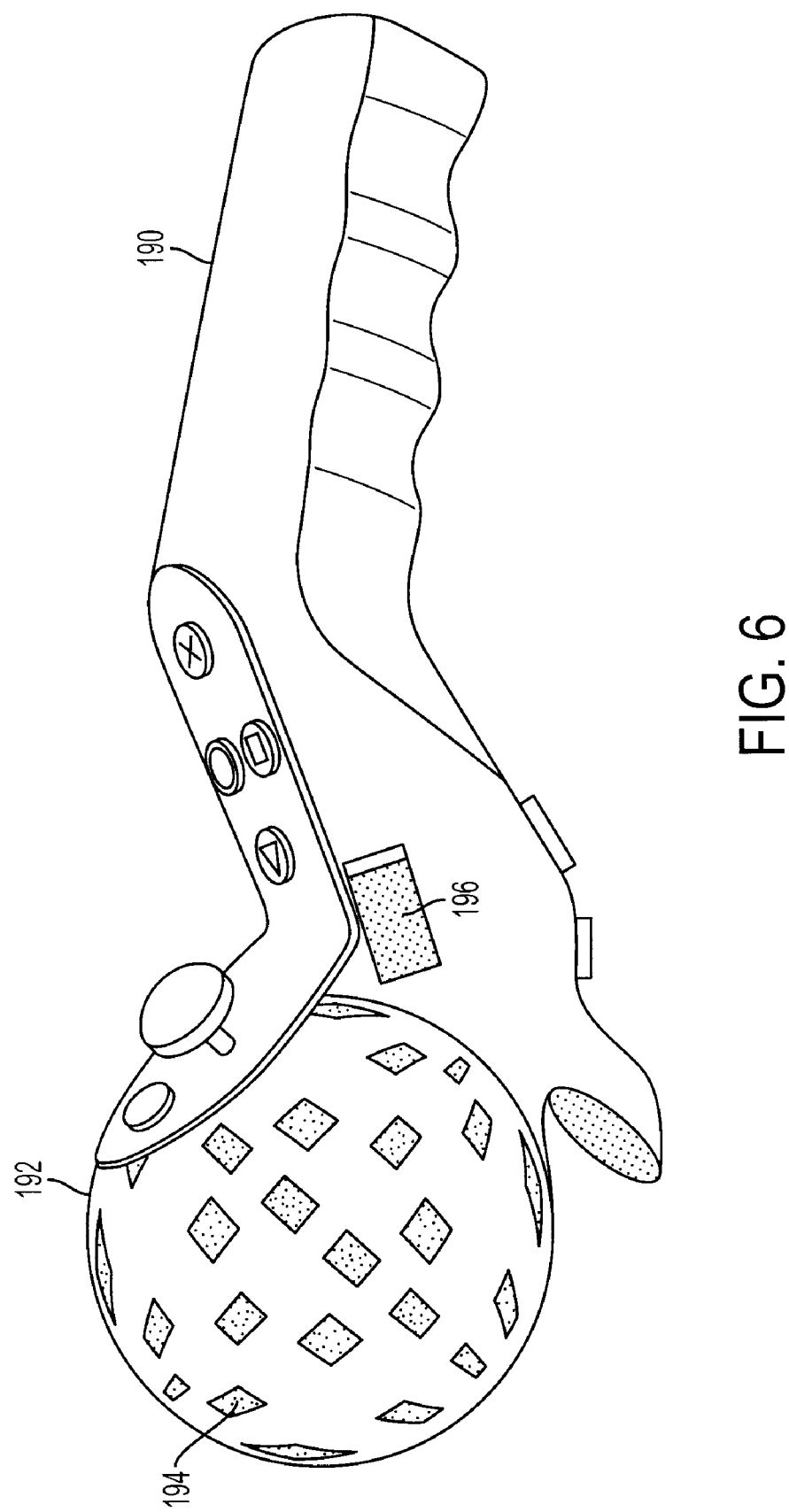
FIG. 6 depicts a controller with ultrasonic capabilities and a spherical section partially covered by retro-reflective material.

FIG. 6 depicts controller 190 with ultrasonic capabilities and spherical section 192 partially covered by retro-reflective material 194. A retroreflector is a device or surface that reflects a wave front back along a vector that is parallel to but opposite in direction from the angle of incidence. This is unlike a mirror, which does so only if the mirror is exactly perpendicular to the wave front. By making spherical section 192 retroreflective, or at least partially retroreflective, the light coming from a source next to a remote light capture device, will reflect back towards the light capture device, as seen in FIG. 14B. This increases the amount of light reflected back, as compared to non-retroreflectors, allowing for higher image contrast and better controller recognition in the captured image. In another embodiment, spherical section 192 is fully covered by retroreflective material for maximum light reflection.

It should be understood that each feature of each embodiment may be mixed with a feature of another embodiment of the present invention to create hybrid embodiments. For example, the retroreflective coated spherical section may also have contained therein IR source that allows IR light from inside the spherical section to pass through transmissive areas of the sphere where no retroreflective material is present.

Figure 7:
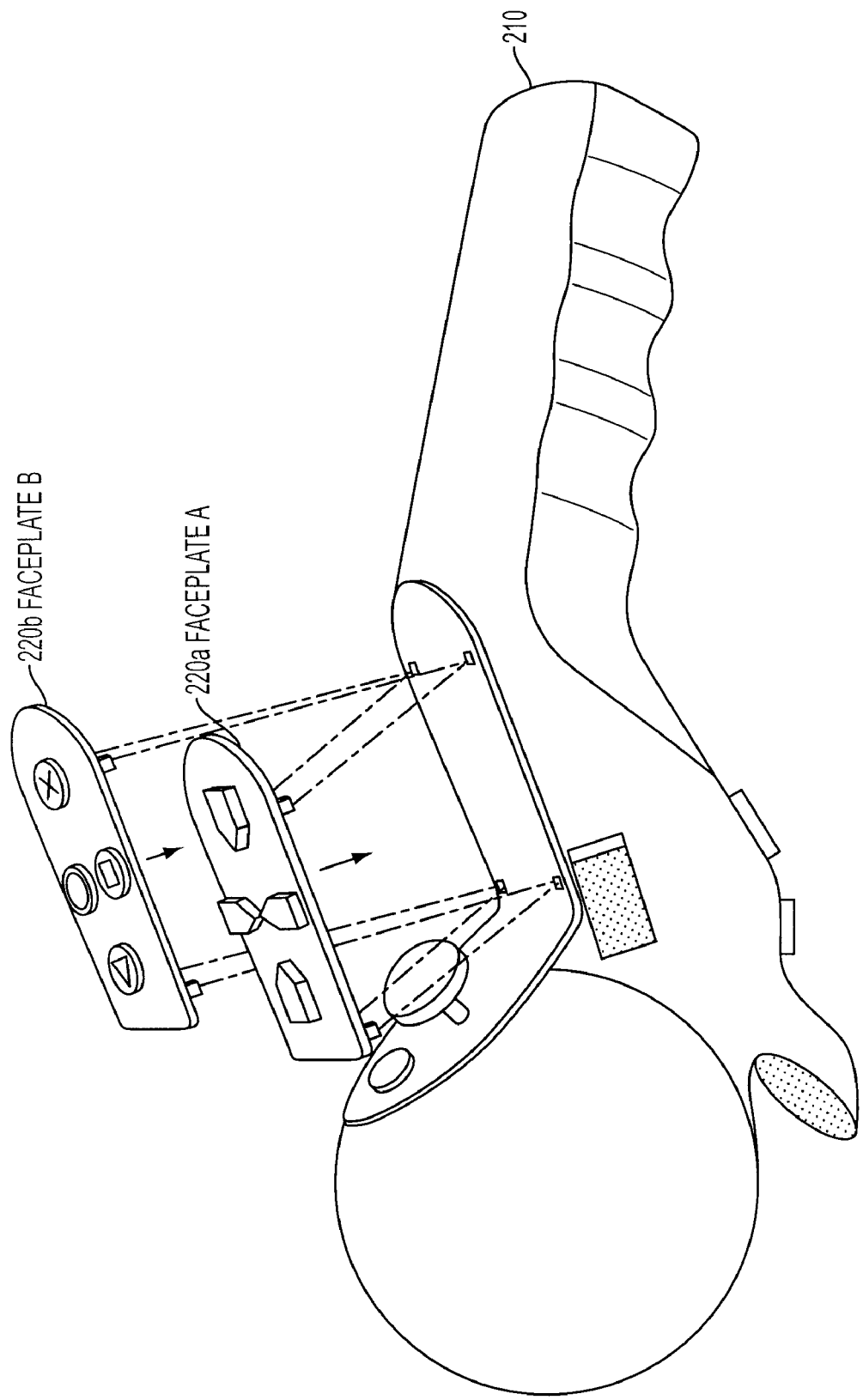
FIG. 7 describes one embodiment with a single-hand controller that has exchangeable face plates.

FIG. 7 depicts one embodiment of single-hand controller 210 that has exchangeable face plates. Different faceplates, such as 220a and 220b, enable distinct keypad configurations and give the user more flexibility in selecting input methods when playing different games. In the embodiment show in FIG. 7, the user has the option of using faceplate A 220a which includes a directional pad, or faceplate B 220b which includes 4 buttons.

FIG. 8 shows a schematic representation of two single-hand controllers, 300a and 300b, joined together by insert plate 302 to form a controller intended to be used with two hands, according to one embodiment. The insert plate adds input options for the user. By using a faceplate between the controllers, the distance between them is fixed and well-known. A remote computing system tracks the movements of both controllers for improved accuracy. Additionally, by taking into consideration the fixed distance between the controllers, the computing system can further refine location detection and controller orientation using triangulation techniques.

Figure 9A:
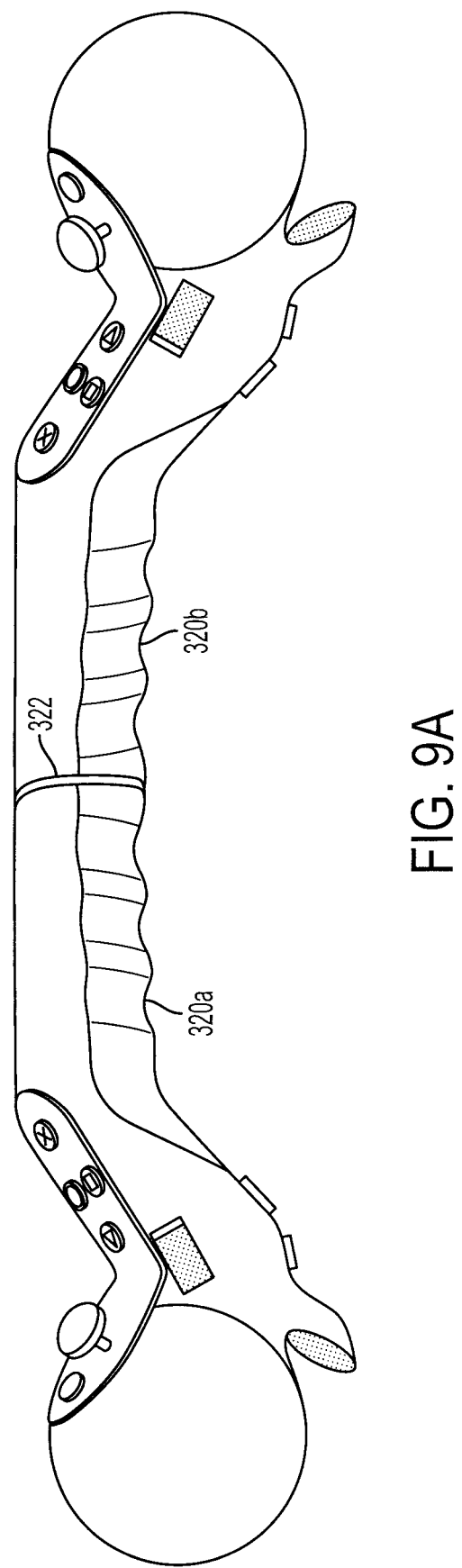
FIGS. 9A-9B depict two single-hand controllers joined at the base to form a single-hand controller in one embodiment.
Figure 9B:
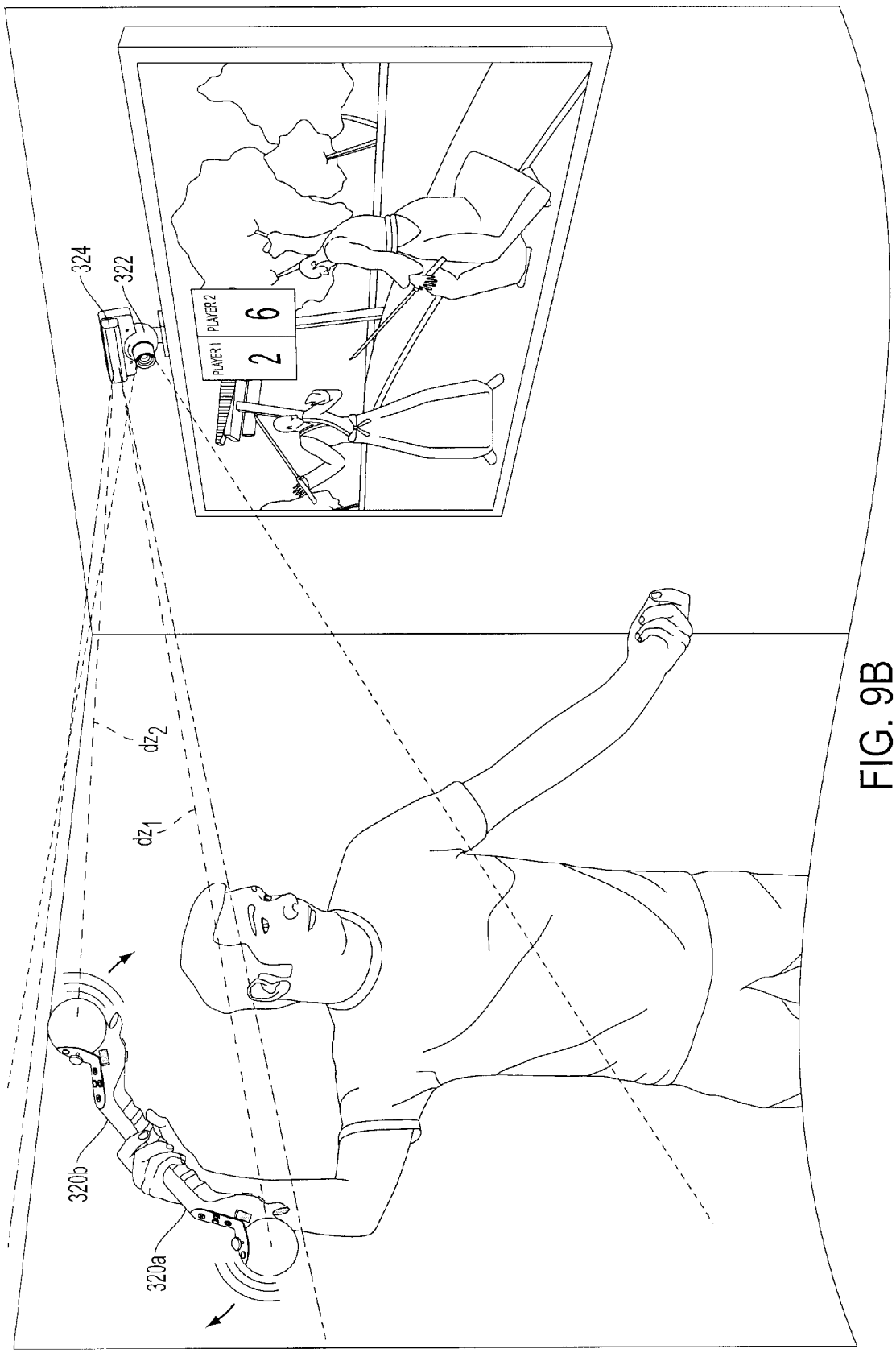

FIGS. 9A-9B depict two single-hand controllers joined at the base to form a single-hand controller in one embodiment. Locking mechanism 322 enables single-hand controllers 320a and 320b to be connected at the base. In one embodiment, the shape of controllers 320a and 320b is configured to enable interlocking of the controllers. In another embodiment, an adapter is used to connect the controllers. The adapter can be rigid forming a rigid structure in combination with the controllers, or the adapter can be flexible allowing for different and changing shapes of the combination. For example, the adapter can include a rope-like mechanism wherein the combination with the two controllers could be used in a game as a nunchaku. Still yet, in another embodiment, the adapter can extend along a longitudinal direction with a telescopic mechanism, resulting in a combination resembling a long sword or javelin. In another embodiment, an electrical connection is made between the controllers so the computing system can detect that the controllers are connected, or to enable communications directly between the controllers. This combination can be referred to as a "sword" or a "wand" configuration. Similarly to the controller combination from FIG. 8, the "sword" configuration enables the remote computing device to track both controllers for improved accuracy.

FIG. 9B shows a three dimensional playing environment that includes a "sword" controller. Camera 322 and sound capture device 324 track both controllers. For example, ultrasound communication is used to determine distances $d_{z1}$ and $d_{z2}$ from the controllers to sound capture device 321. The computing system detects the position in space and calculates the locations of both controllers' ends. In one embodiment, the line joining the two controllers is translated to a similar positioning of a tool or weapon on the screen.

Figure 10:
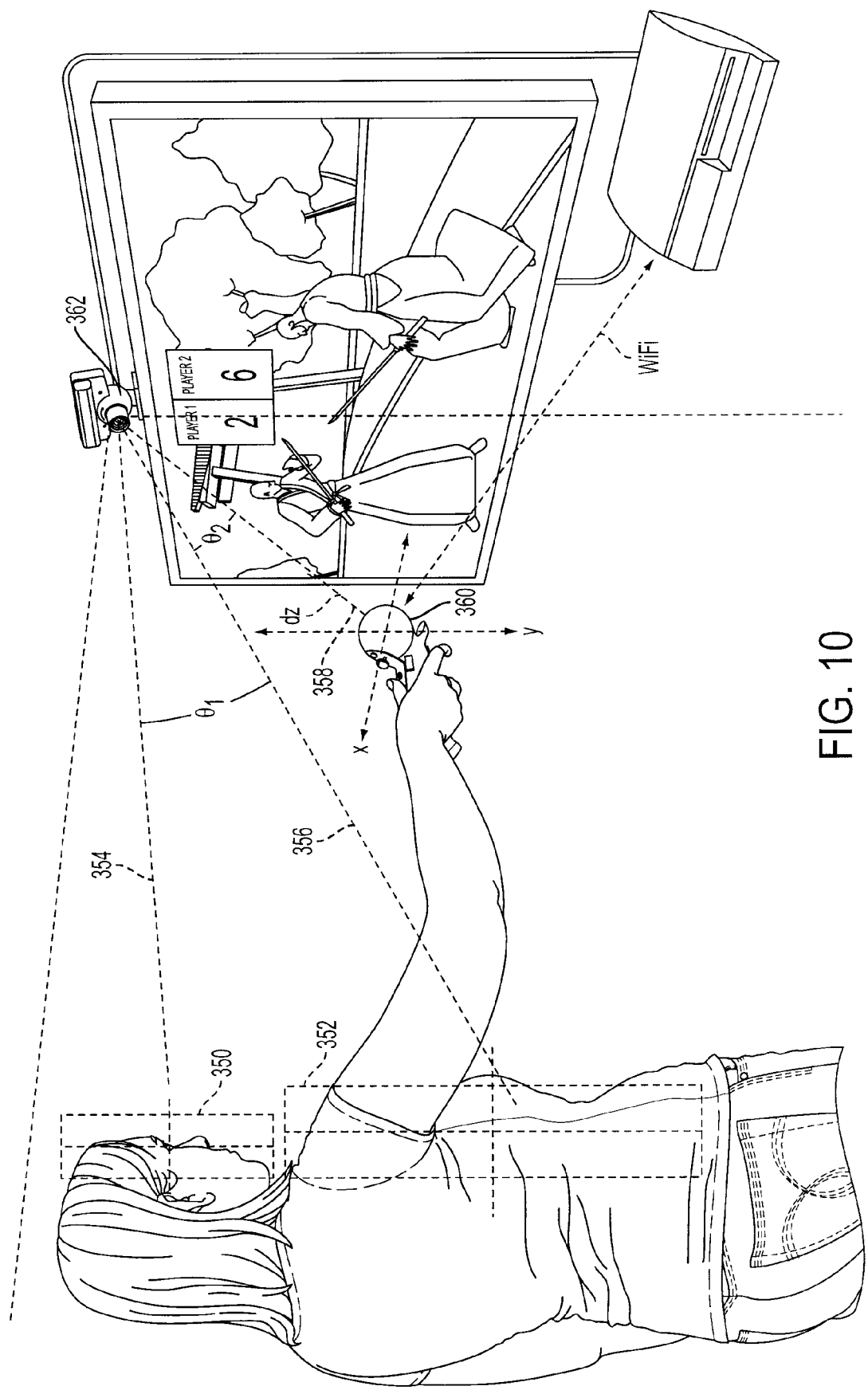
FIG. 10 illustrates visual tracking of controller and user features according to one embodiment.

FIG. 10 illustrates visual tracking of controller 360 and of user features according to one embodiment. Image data captured by camera 362 is analyzed to calculate not only the (x,y) position of the controller, but also to detect human features in order to consider the player and controller positions as inputs to the game. In one embodiment, head area 350 and torso area 352 are tracked. In other embodiment the eyes of the player are tracked (not shown). Line 354 shows the direction towards the user's face, line 356 shows the direction to the torso, and line 358 shows the direction and distance to the controller. Changes in the angles $\theta_1$ and $\theta_2$ between the different lines indicate relative changes in the position of the player with respect to the controller.

Figure 11:
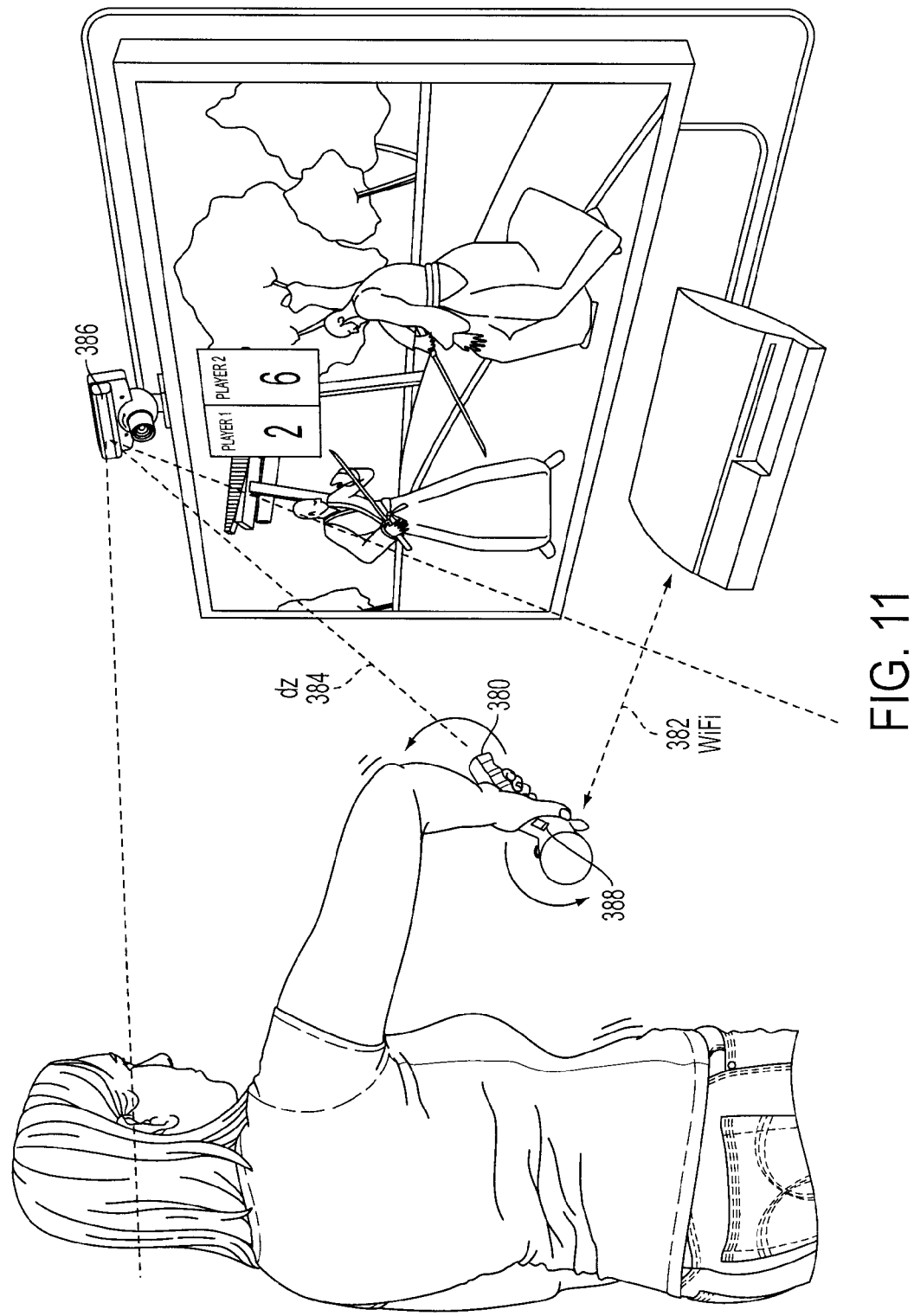
FIG. 11 shows controller movement tracking in one embodiment.

FIG. 11 shows controller movement tracking in one embodiment. Besides a spherical section and ultrasound communications, controller 380 includes an inertial analyzer 388 that tracks controller 380 for inertial activity. The data from inertial analyzer 388 is transmitted 382 to a computing system. Various types of inertial sensor devices may be used to provide information on 6-degrees of freedom (e.g., x, y and z translation, and rotation about x, y, and z axes). Examples of suitable inertial sensors for providing information on 6-degrees of freedom include accelerometers, one or more single axis accelerometers, mechanical gyroscopes, ring laser gyroscopes or combinations of two or more of these. The signals from internal analyzer 388 are analyzed to determine the motion and orientation of the controller during play of a video game. In one embodiment, the inertial analysis data is communicated to the computing system via WiFi™ 382 wireless communication. Alternatively, a wired communication, or a combination of wired and wireless is also possible. Also, although WiFi™ is specifically identified, other wireless modes and standards may be used to accomplish the communication.

Figure 12B:
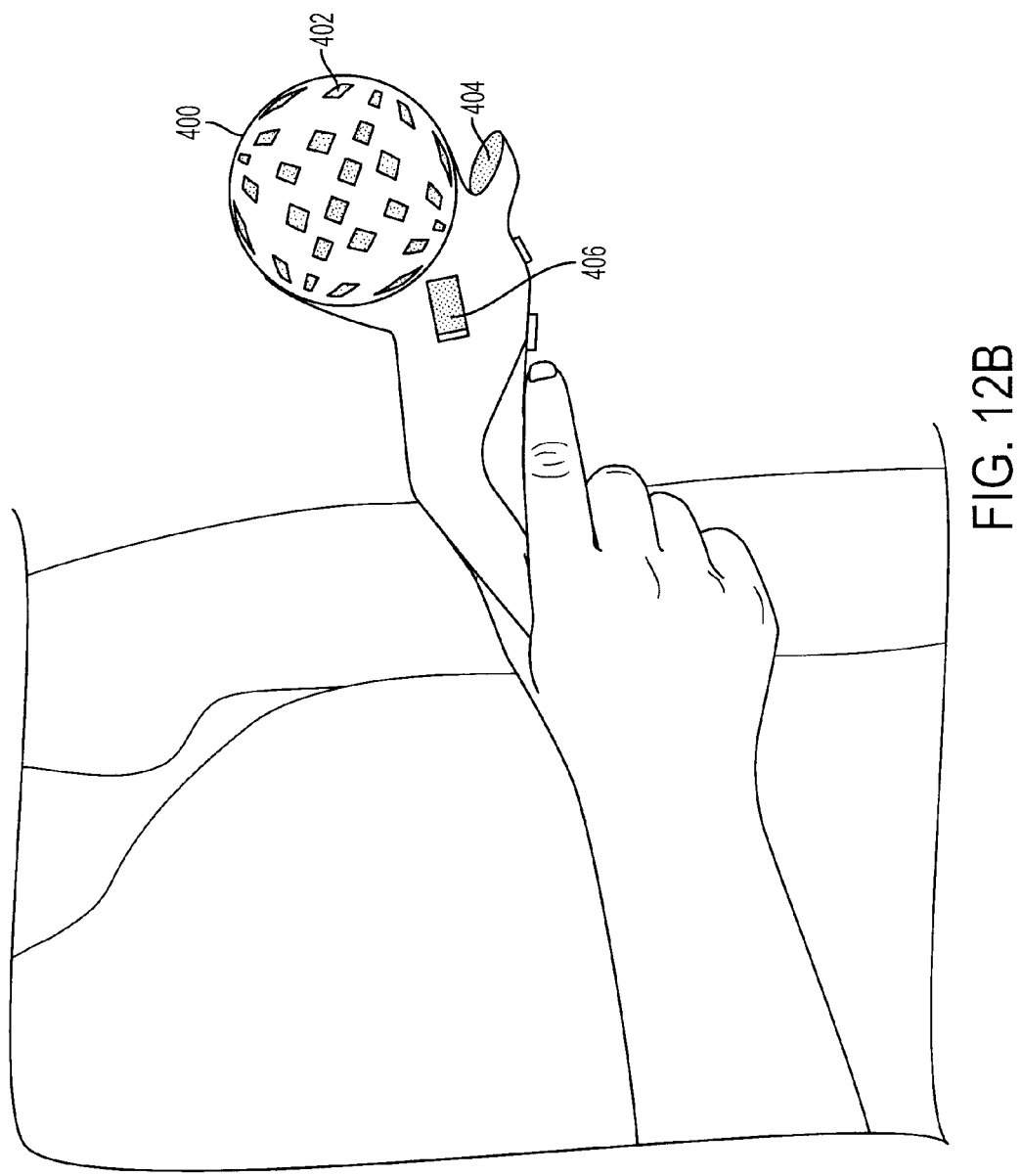

FIGS. 12A-12B show different views of a single-hand controller held by a player. FIG. 12A illustrates a typical view from the perspective of a camera facing the player. In this embodiment, controller 400 includes retroreflective material 402 to reflect the light coming from a source next to or around the camera, causing the reflected light to bounce back in the opposite direction to maximize the amount of light that travels back towards the camera. From the camera point of view, sound interface 404 is also visible.

FIG. 12B shows a side view of the controller that includes spherical section 400 with retroreflective material 402 and sound interfaces 404 and 406.

Figure 13:
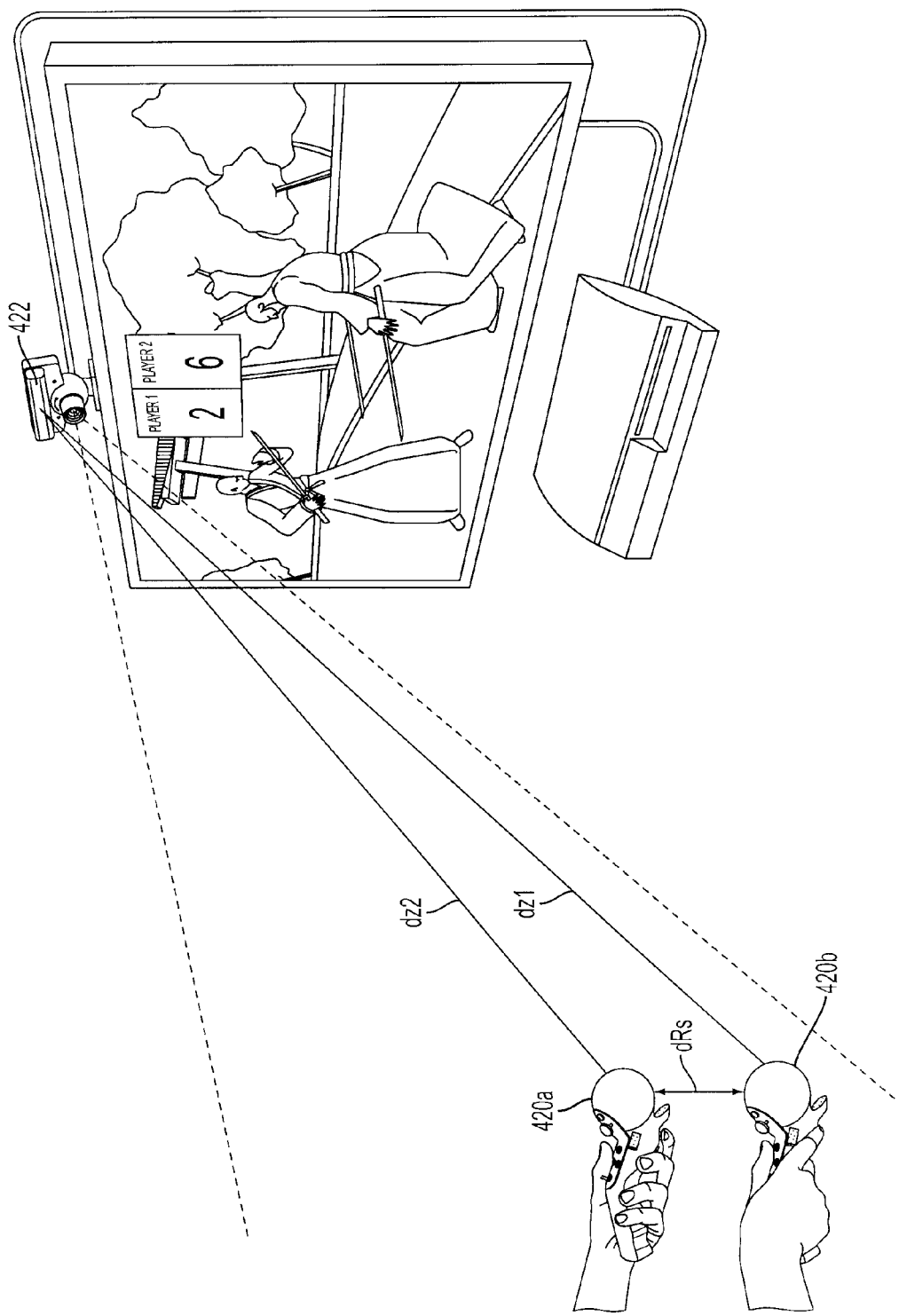
FIG. 13 shows a schematic representation of a player using single-hand controllers to illustrate the use of ultrasound for determining relative distances, according to one embodiment.

FIG. 13 shows a schematic representation of a player using single-hand controllers 420a and 420b to illustrate the use of ultrasound for determining relative distances, according to one embodiment. Both controllers support two-way ultrasound communications to sound receiver 422 and between themselves. In one embodiment, controllers 420a and 420b send and receive sound information. The captured sound information is sent to a computer program for processing in order to calculate the distance between controllers $d_{RS}$. In another embodiment, a processor inside one of the controllers measures the travel time of the sound between the controllers to calculate $d_{RS}$, which is then sent to the remote computer program that uses this information in calculating the positions of the controllers in the three dimensional capture area. As previously described with respect to FIG. 1, synchronization is necessary to use the ultrasonic measurements to calculate distances.

Figure 14A:
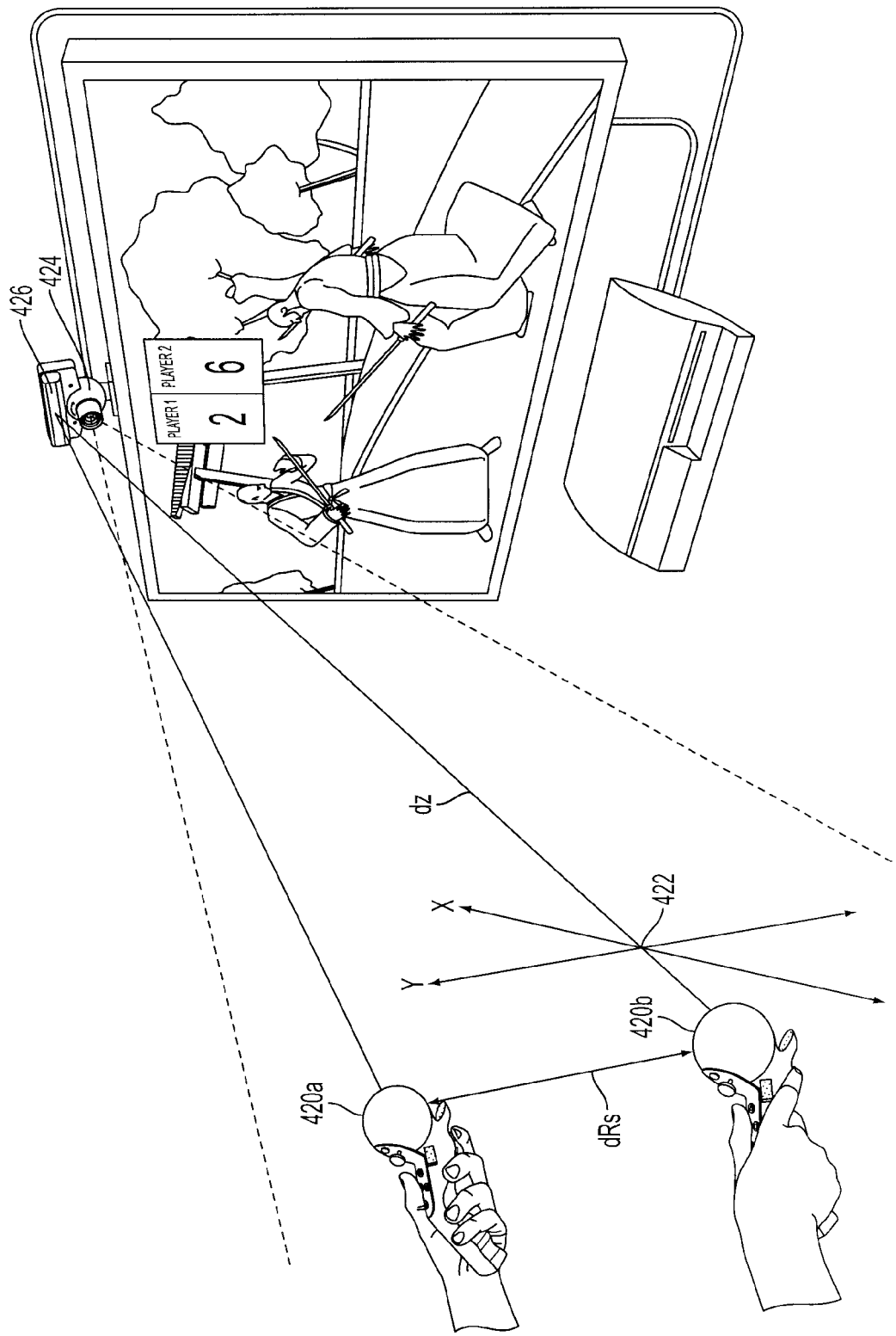
FIGS. 14A-14B illustrate the determination of the three-dimensional locations of two controllers using video and ultrasound, according to one embodiment.
Figure 14B:
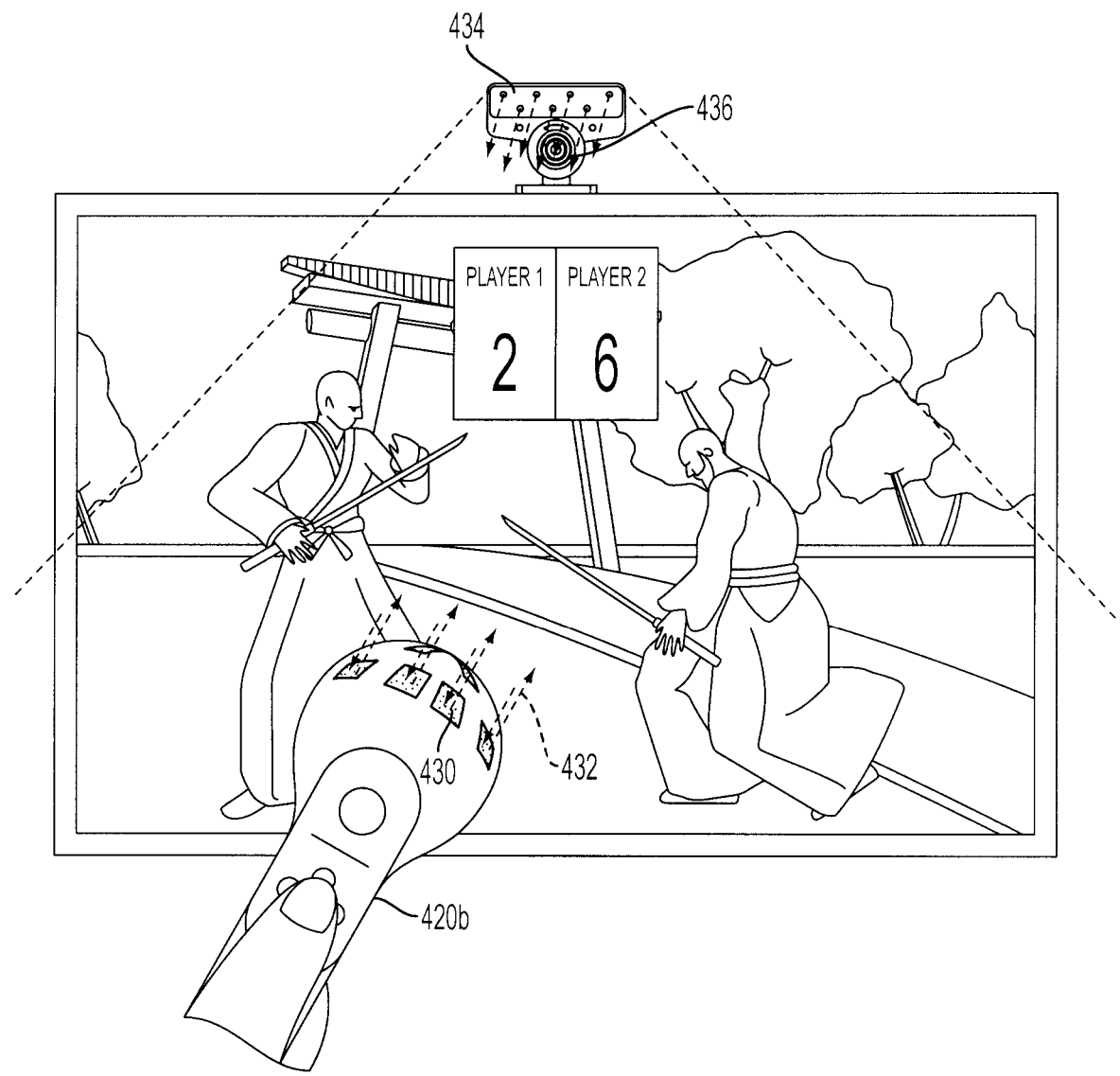

FIGS. 14A-14B illustrate the determination of the three-dimensional locations of two controllers using video and ultrasound, according to one embodiment. FIG. 14A depicts the same user as in FIG. 13 after some time has passed, where the user hands have moved and placed the controllers at a greater distance $d_{RS}$ than in FIG. 13. In this example, the wider hand separation reflects into a wider hand separation of the avatar in the screen. In the embodiment depicted in FIG. 14B, controller 420b includes retroreflective material used to reflect the infrared light originating at infrared light emitters 433. The reflected light is captured by infrared camera 326 to produce image data which is then analyzed to determine the controller's location. In other embodiment, camera 436 is both an infrared camera and a visible spectrum camera. Camera 436 alternates taking image data from the infrared and the visible spectrum. Both types of measurements are then used by the computing system to calculate the x, y position. By using two methods for locating the controller, higher accuracy is achieved.

Figure 15:
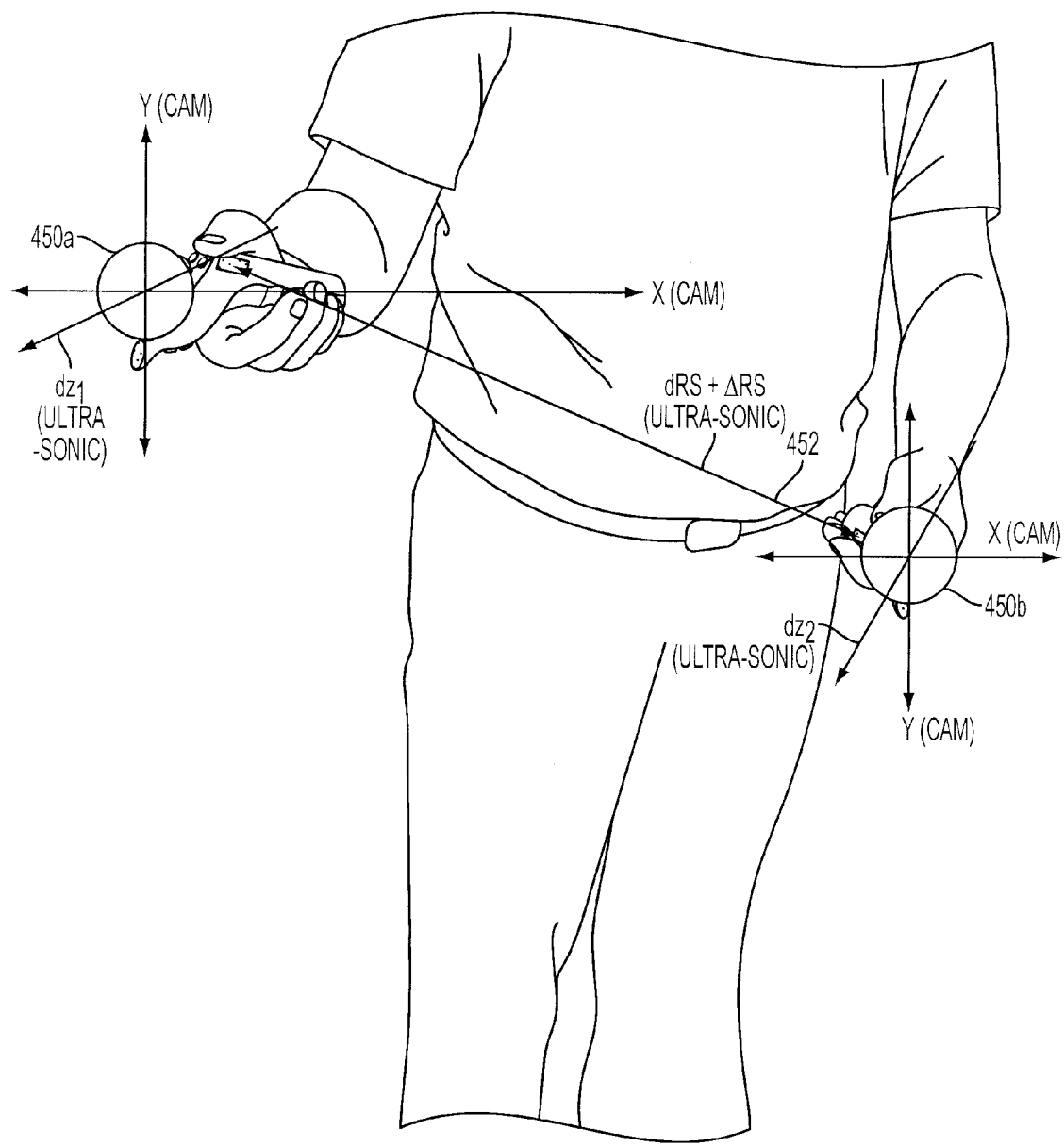
FIG. 15 describes determining the location of two controllers using ultrasound to measure the distance between the controllers, in accordance with one embodiment of the present invention.

FIG. 15 describes determining the location of two controllers 450a, 450b using ultrasound to measure the distance between the controllers, in accordance with one embodiment of the present invention.

Figure 16:
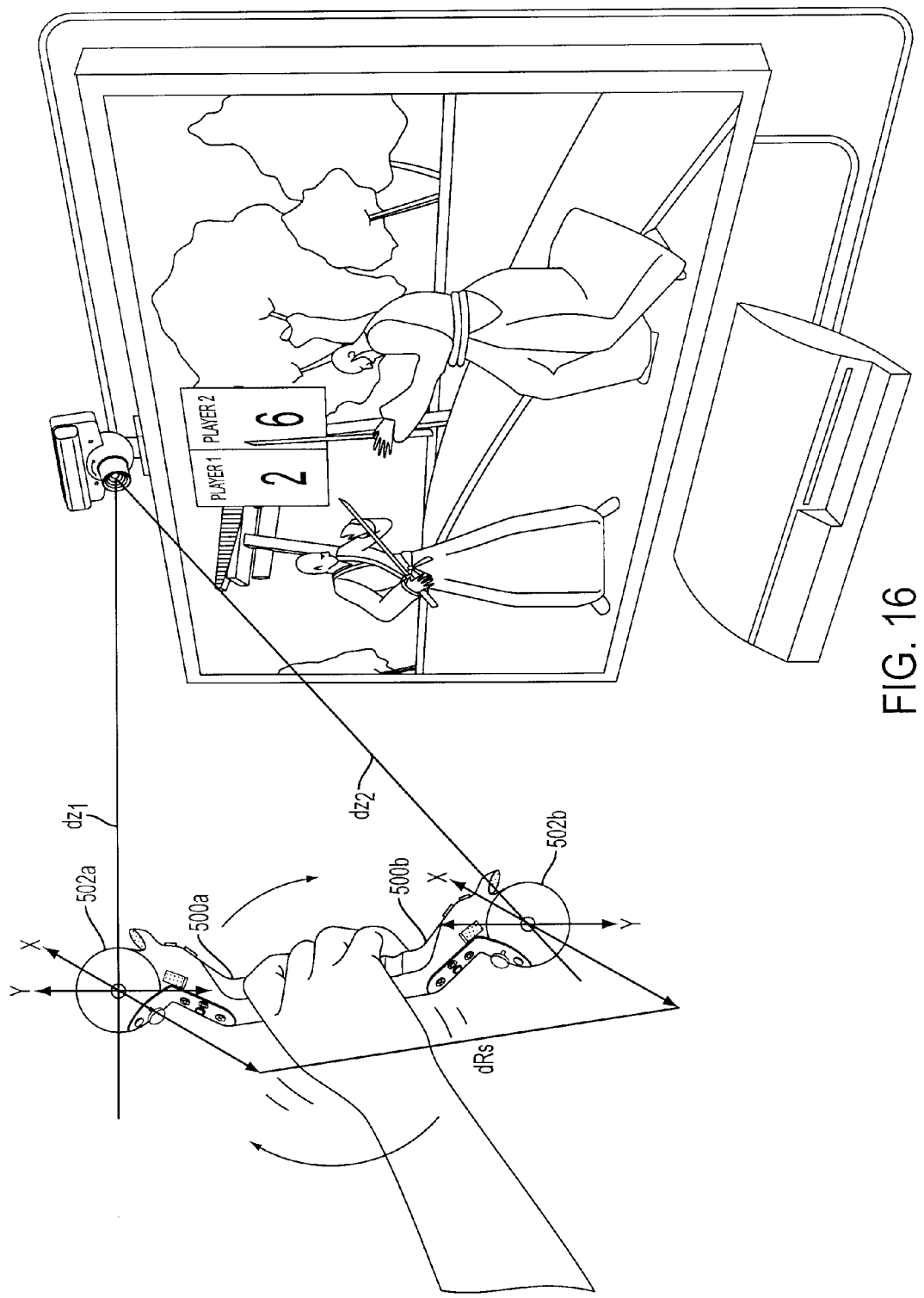
FIG. 16 illustrates the determination of the location of a controller formed by joining two controllers, as seen in FIG. 9a, using information related to each controller, according to one embodiment.

FIG. 16 illustrates the determination of the location of a controller formed by joining two controllers, as seen in FIG. 9A, using information related to each controller, according to one embodiment. Controllers 500a and 500b have been joined together, as previously discussed with respect to FIGS. 9A and 9B. The position of each controller is calculated separately and then the distance between controllers, $d_{RS}$, is included in the location calculations to increase accuracy. Because $d_{RS}$ is known, the measured distance between controllers is compared to the known distance so adjustments to the controllers' positions can be made.

In one embodiment, a set of several consecutive measurements are tracked in order to smooth out deviations or glitches in the measurements. The sampling frequency for the different measurements varies according to the required precision and to the availability of computing resources. For example, a fighting interactive game will require a higher frequency of measurements than an interactive chess game.

Figure 17:
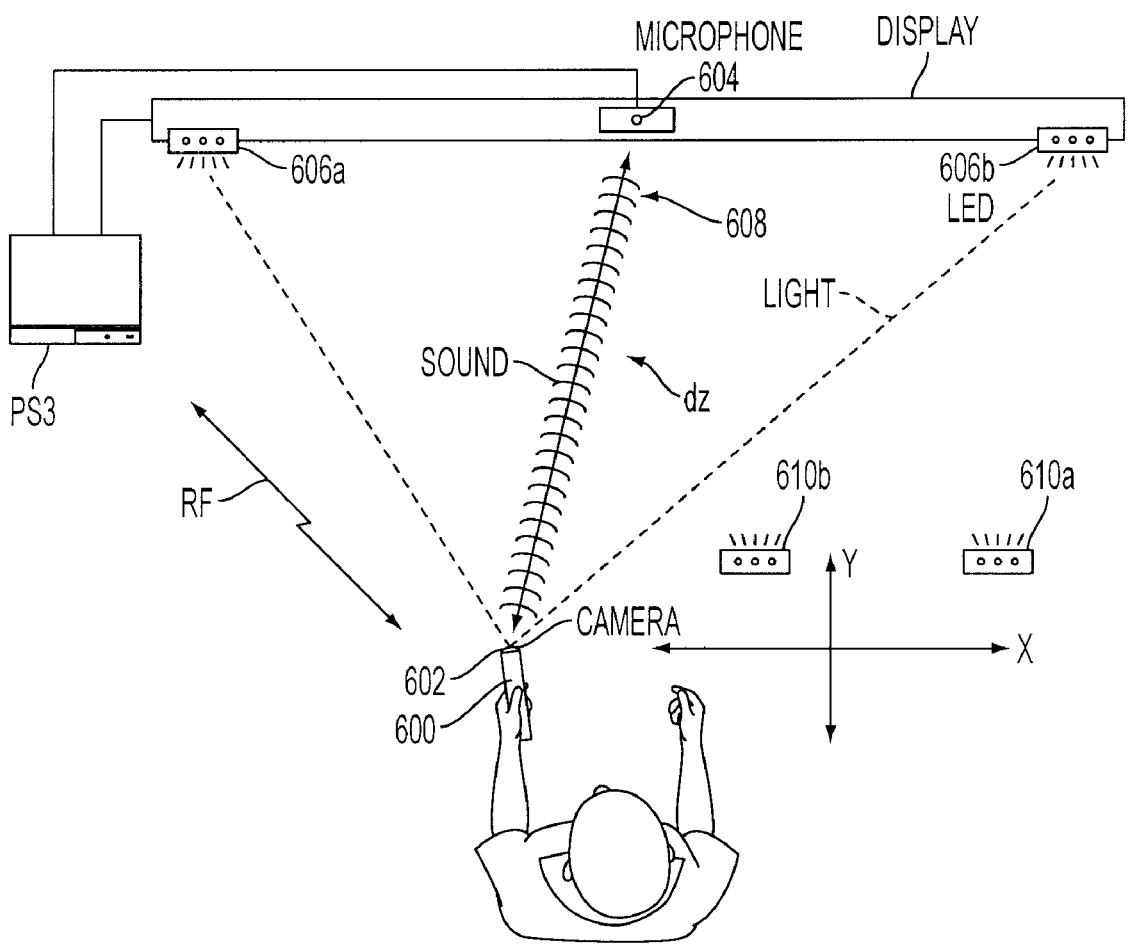
FIG. 17 shows a top view of an embodiment that includes controller 600 with embedded camera 602 and ultrasound communications.

FIG. 17 shows a top view of an embodiment that includes controller 600 with embedded camera 602 and ultrasound communications. In this embodiment, the camera is at the controller instead of near the display area. Light emitters 606a and 606b are located approximately at different ends of the display. Image data is captured by camera 602, and the light from light emitters 606a and 606b helps in the identification of the location of the controller. Light emitter locations 610a and 610b represent the locations of the light emitters within the x and y axes. Ultrasonic communications between microphone 604 and controller 600 are used to calculate distance d, from the controller to the microphone.

In one embodiment, the image captured by camera 602 is transmitted to computing device PS3 and the computing device then processes the image captured to calculate the x and y locations of the controller. In another embodiment, a processor in controller 600 processes the image data and calculates the controller position, which is then transmitted to computing device PS3. In other embodiment, controller 600 does partial processing of the image data and a subset of data is then sent to computing device PS3 for final processing.

Figure 18:
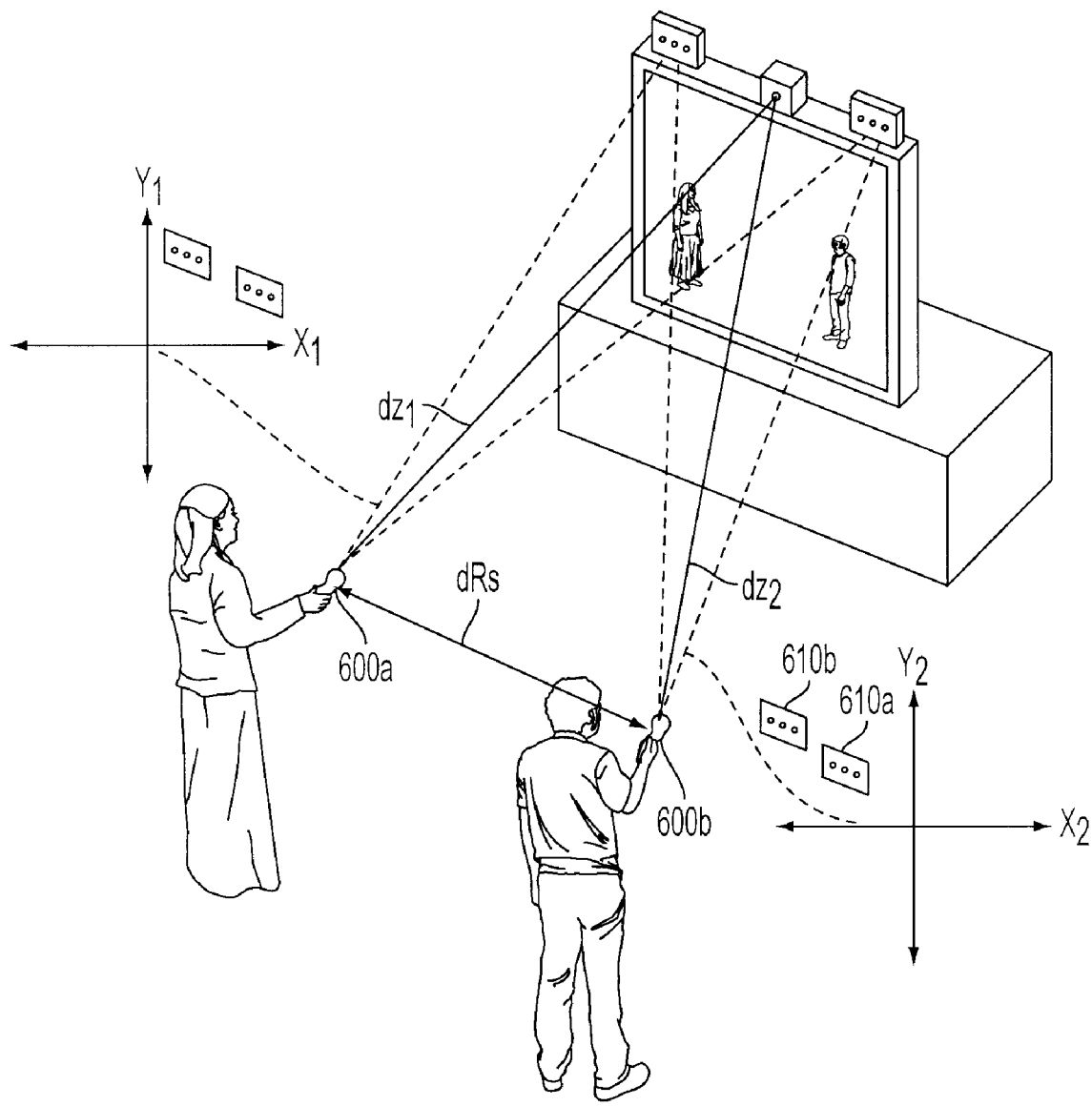
FIG. 18 illustrates two players using single-hand controllers with video and sound capabilities, according to one embodiment.

Another embodiment where the camera resides at the controller is show in FIG. 18, which illustrates two players using single-hand controllers 600a and 600b with video and sound capabilities, according to one embodiment.

Since the camera resides at the controller, it is not required to have a spherical section, or any other easily recognizable shape, at the front of the controller resulting in slimmer designs. FIGS. 19A-19D shows different embodiments of single-hand controllers with video and ultrasound capabilities. Controller 650 has a basic configuration with camera 652 and ultrasound interface at the front. Controllers 660 further includes a lateral sound interface 662, which can be used to communicate with other controllers, or even to the sound capture interface near the display system when the controller is directed away from the screen during interactive playing.

Controller 670 from FIG. 19C includes grip 676 configured to accommodate the player's hand while using the controller, joystick 674, and keypad 672 for input entry. Controller 680 adds lateral interface 622, similar to the one in controller 660 of FIG. 19B.

Figure 20:
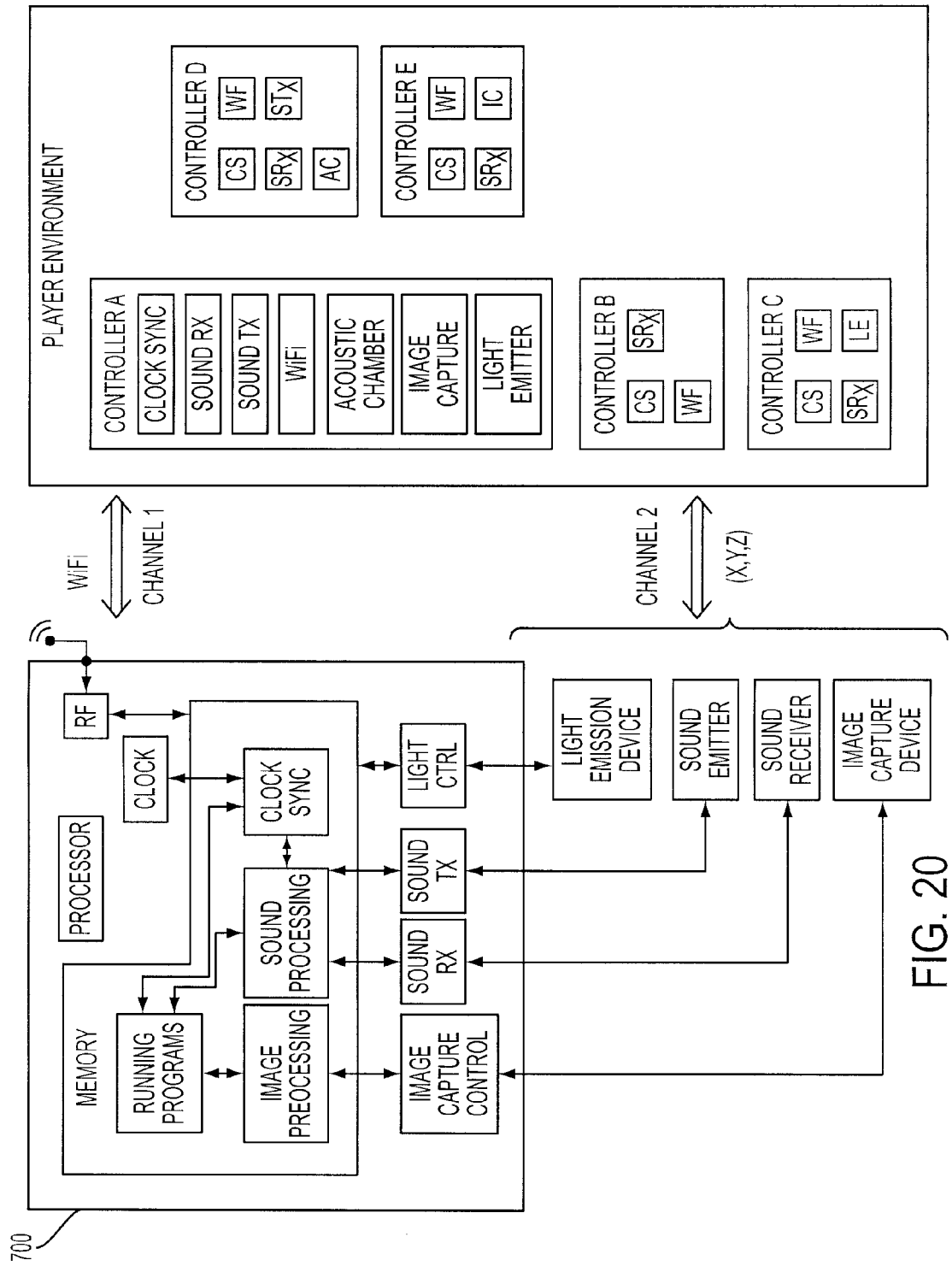
FIG. 20 is a block diagram of the different elements in the entertainment system.

FIG. 20 is a block diagram of the different elements in the entertainment system. The computing system and its components are located on the left side of FIG. 20, and the player environment is shown on the right side. Computing system 700 includes a processor, a memory area, a clock, and communication interfaces. The communication interfaces include a radio-frequency (RF) interface for wireless communications to the controllers, such as communications using the WiFi™ protocol. Other communications methods include image capturing, sound transmission and reception (ultrasonic in this embodiment), and light emitters.

The different communication devices connected to computing system 700 connect to the respective controllers inside the computing system. The memory area includes running programs, an image processing area, a sound processing area, and a clock synchronization area. Running programs include a gaming program, image processing program, sound processing program, clock synchronization program, etc. These programs use the corresponding areas of memory, such as the image processing area containing image data, the sound processing area containing ultrasound communications data, and the clock synchronization area used for the synchronization with remote devices.

Several embodiments for controller configuration are shown in the player environment area. Controller A represents a "fully loaded" controller with many of the features previously described. Controller A includes a Clock Synchronization (CS) module used for clock synchronization with computing system 700; a Sound Receiver (SRx) for receiving ultrasonic data; a Sound Transmitter (SRx) for sending ultrasonic data; a WiFi (WF) module for WiFi communications with computing system 700; an Acoustic Chamber (AC) for conducting sound to and from the front and/or the sides of the controller; an Image Capture (IC) device, such as a digital video camera, for capturing image data; and a Light Emitter (LE) in the infrared or visible spectrum for easier image recognition from the image processing module at computing system 700.

Additionally, controller A includes a spherical section (not shown), to improve image recognition by a remote capture device. The spherical section includes retroreflective material that increases the amount of light, sent by a light emitter next to the image capture device, reflected back towards the image capture device. The light created by the light emitter can be in the infrared or the visible spectrum, therefore the image capture device will work in the same light spectrum. The different components in Controller A can be implemented as separate devices or modules inside Controller A. In another embodiment, the different components in Controller A are grouped into a smaller number of integrated components enabling a more compact implementation. The various controllers can also include one or more USB plugs, to enable charging of the controllers when connected to the game station or a computer.

According to the intended use of a given controller, simpler configurations can be used with less features than those described for controller A. Some embodiments of simpler devices are shown with respect to controllers B-E utilizing a subset of features from those described for controller A. The person skilled in the art will readily appreciate that similar configurations are possible within the spirit of the invention by adding or subtracting components, as long as the principles of the invention are maintained.

Figure 21:
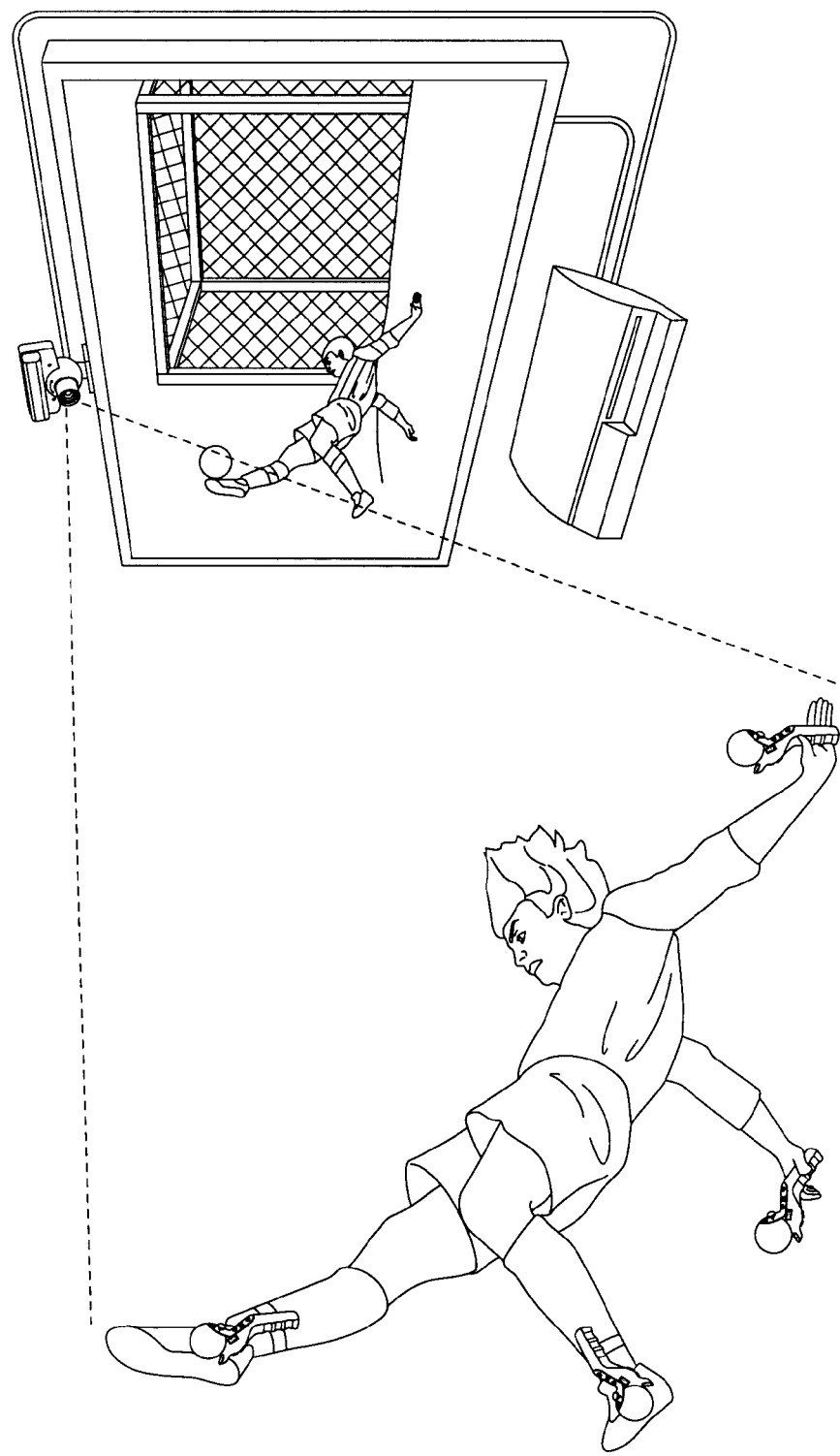
FIG. 21 depicts an embodiment for interactive play using four controllers located near the hand and feet of the player.

The concept of two controllers with three-dimensional location capabilities can be expanded to a plurality of controllers located on or near the body of the player or multiple sensors for triangulation and better view of the controller at all times. In one embodiment, a plurality of microphones are placed around the capture area in order to get different geometric readings of the location of the controller, enabling triangulation calculations for improved accuracy. FIG. 21 depicts an embodiment for interactive play using four controllers located near the hand and feet of the player. In this embodiment, two controllers are strapped to the arm or hand of the player, and two more controllers are strapped to the feet or legs of the player. The example shows a player doing a bicycle kick that translates to a bicycle kick for the corresponding avatar in the computer game. In one embodiment, the images from a camera facing the player are shown in the display mixed with other virtual objects added to the game, thus making the player part of the game scene. In this embodiment, the ball, goals, field, other players, public, etc., are added to the image of the player, and the movements of the player to kick an imaginary ball are translated in the game world to movements in the display to kick the imaginary game ball. In a multiplayer environment, other players are introduced in the virtual world based on the captured image data mixed with virtual objects. The other players can be in the same capture area as the player kicking the ball, or can be connected to the game remotely allowing for distributed multiplayer gaming. Other similar applications include fighting, car racing, dancing, and exercise games, as well as many other sport games such as football, tennis, boxing, baseball, basketball, hockey, etc.

Figure 22:
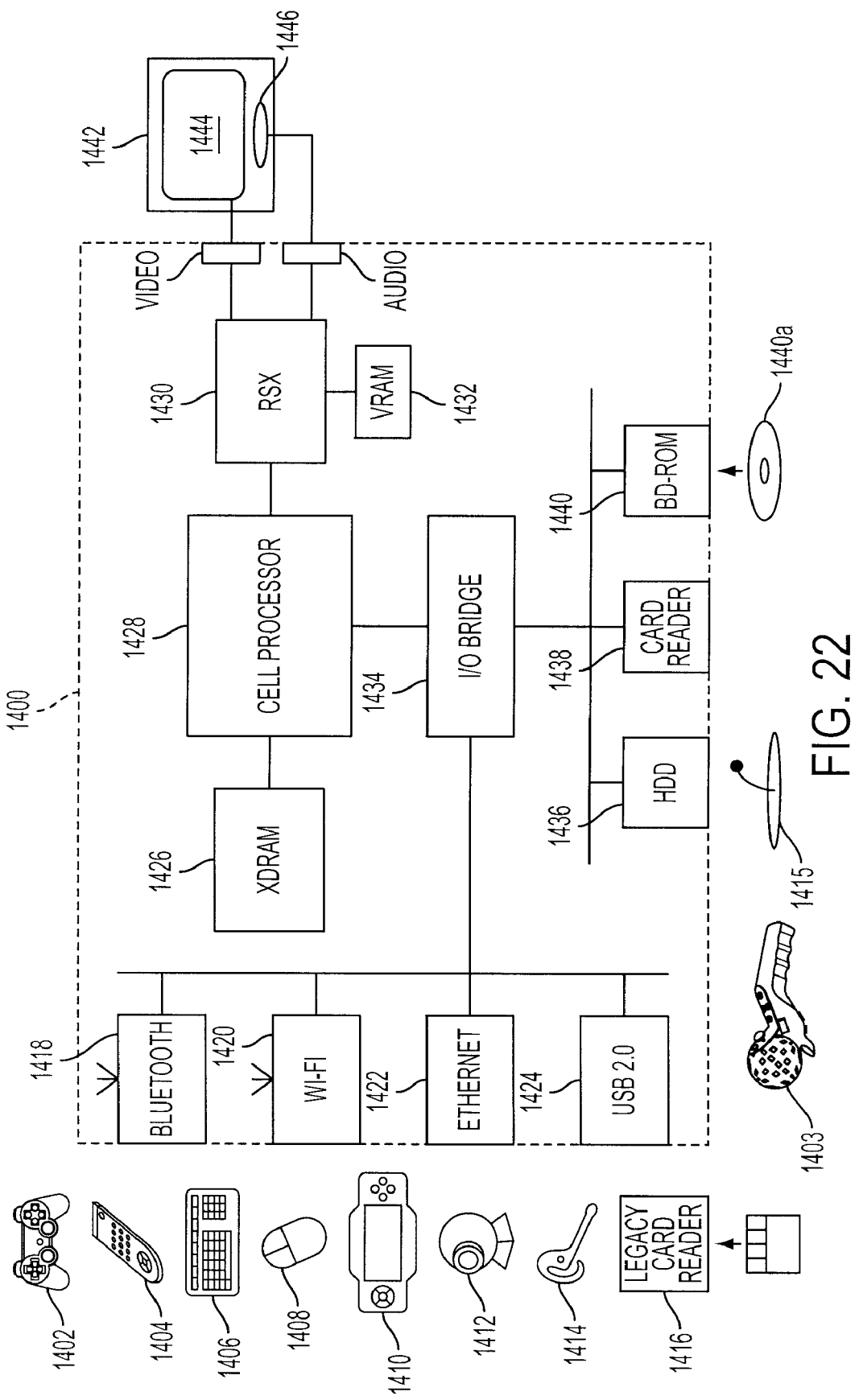
FIG. 22 illustrates hardware and user interfaces that may be used to determine controller location, in accordance with one embodiment of the present invention.

FIG. 22 illustrates hardware and user interfaces that may be used to determine controller location, in accordance with one embodiment of the present invention. FIG. 22 schematically illustrates the overall system architecture of the Sony® Playstation 3® entertainment device, a console that may be compatible for implementing a three-dimensional controller locating system in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

In the present embodiment, the game controllers 1402-1403 are operable to communicate wirelessly with the system unit 1400 via the Bluetooth link. However, the game controllers 1402-1403 can instead be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands and game controller 1403 is a single-hand controller as previously described in FIGS. 1-21. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 23:
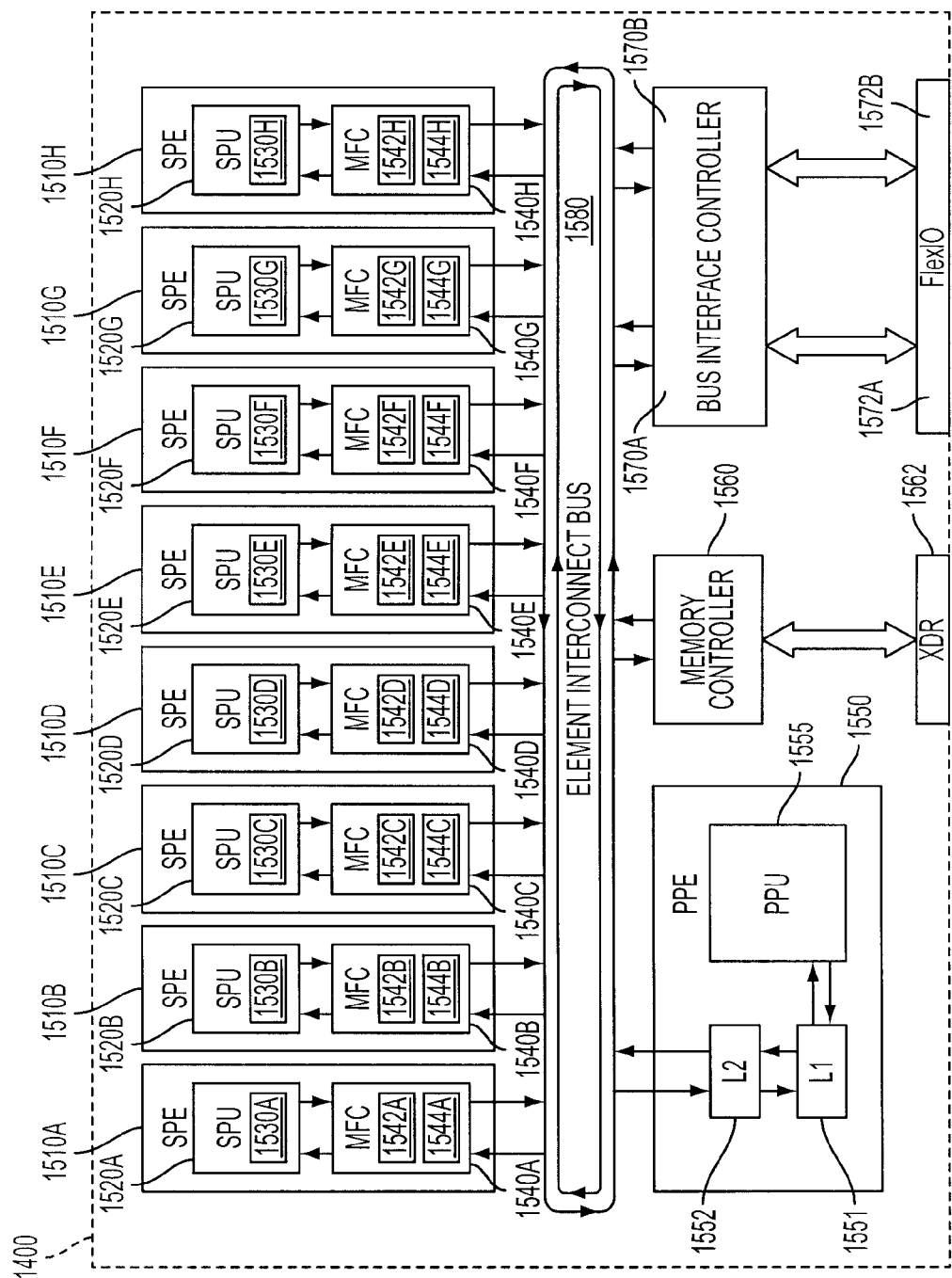
FIG. 23 illustrates additional hardware that may be used to process instructions, in accordance with one embodiment of the present invention.

FIG. 23 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Figure 24:
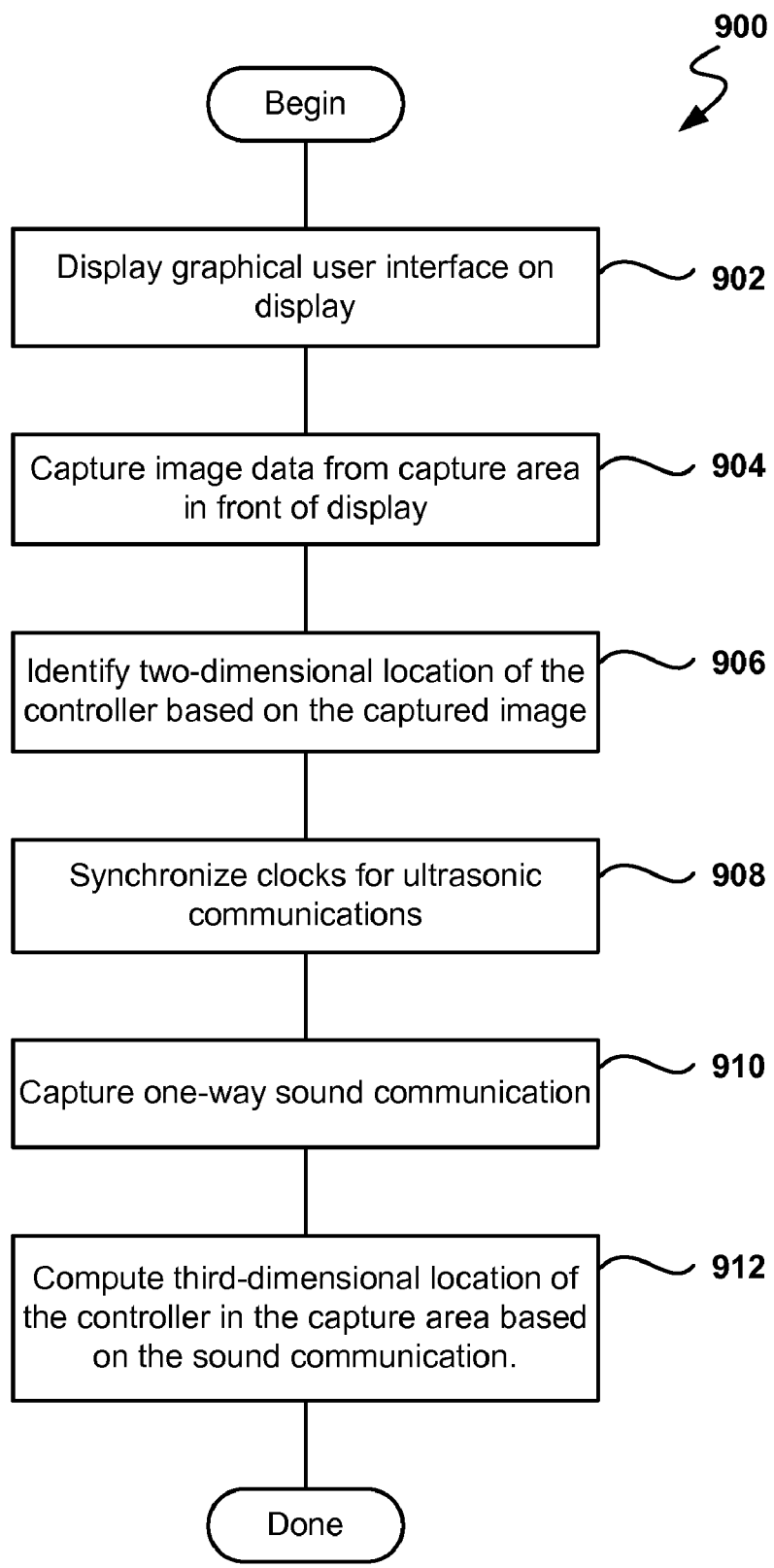
FIG. 24 shows a flow chart describing a method for communicating a single-hand controller with a computing system to determine the three-dimensional location of the controller, according to one embodiment.

FIG. 24 shows a flow chart for communicating a single-hand controller with a computing system to determine the three-dimensional location of the controller, according to one embodiment. In operation 902, a graphical user interface is shown in a display, such as an LCD. In operation 904, image data is captured from a capture area in front of the display. For example, image capture device 106 from FIG. 1 is used to capture image data from capture area 118. In one embodiment, image capture device 106 is a digital video camera.

In operation 906, the two-dimensional location of the controller is identified based on the captured image. For example, the image data is kept in the image processing module of computing system 700 of FIG. 20, and one of the running programs determines the horizontal and vertical position of the controller are determined as described with respect to FIG. 1.

A clock synchronization operation 908 is performed to synchronize the clocks on each end of the ultrasonic communication between the computing system and the controller. In operation 910, one-way sound communication is captured between a location proximate to the display, and a location at the controller. In one embodiment, the sound originates at the controller and is received by the sound receiver at the computing system. In another embodiment, the sound originates at the computing system location and is received by the controller.

In operation 912, the captured sound communication is used, together with the clock synchronization information, to compute a third-dimensional location of the controller in the capture area. The third dimensional location can be the distance from the sound capture device to the controller, or the depth of the controller within the capture area, as previously described with respect to FIG. 2D.

Embodiments may include capturing depth data to better identify the real-world user and to direct activity of an avatar or scene. The object can be something the person is holding or can also be the person's hand. Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention, users can experience an interactive game environment within their own living room.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for establishing communication between a computer program in a computing system and a controller held in a hand of a user, comprising:
    capturing image data in a capture area in front of a display, the capturing configured to identify a two-dimensional location of a first controller and a two-dimensional location a second controller in the capture area;
    receiving data associated with bi-directional sound communication between the first controller and the second controller;
    capturing one-way sound communication between a location proximate to the display and the first controller; and
    computing a third dimensional location of the first controller in the capture area based on the bi-directional sound communication and the one-way sound communication.

2. The method as recited in claim 1, wherein a two-dimensional location of the first controller is identified by detecting a spherical shape within the image data, the spherical shape being associated with the first controller.

3. The method as recited in claim 1, wherein the captured image data corresponds to one of either an red-green-blue (RGB) pixel image data, a black and white pixel image data, or infrared data.

4. The method as recited in claim 1 further including,
    synchronizing clocks between two ends of the one-way sound communication before capturing the one-way sound communication.

5. The method as recited in claim 1, wherein the one-way sound communication includes a sender of the sound communication at the first controller.

6. The method as recited in claim 1, wherein the one-way sound communication includes a sender of the sound communication at the location proximate to the display.

7. The method as recited in claim 1, further including,
    capturing one-way sound communication between the location proximate to the display and the second controller.

8. The method as recited in claim 1, wherein computing the third dimensional location further includes,
    calculating a distance from the location proximate to the display and the location at the first controller based on a time travel of the sound in the one-way sound communication, and
    calculating a depth within the capture area based on the distance,
    wherein the depth is an orthogonal measure to both dimensions of the two-dimensional location.

9. The method as recited in claim 1, further including,
    presenting in a graphical user interface in the display an object based on the two-dimensional location and the third dimensional location.

10. A system for establishing communication between a computer program and a controller, comprising:
    an image capture device for capturing image data in a capture area in front of a display;
    a sound capture device for capturing sound data in the capture area; and
    a computing system for executing the computer program, the computing system being connected to the display, the image capture device, and the sound capture device;
    wherein a first controller is operable to be held by a user with a single hand, the first controller including,
        a body with a first end and a second end;
        a grip area at about the first end;
        an input pad defined between the first end and the second end for entering input data to be transmitted to the computing system;
        a spherical-type section defined at the second end for facilitating image recognition by the image capture device of a spherical shape of the spherical-type section;
        a microphone; and
        a sound emitting device near the second end, the sound emitting device directed away from the user when held and configured for one-way sound communication with the sound capture device;
    wherein the computer program identifies a two-dimensional location of the first controller based on the captured image data and a third dimensional location of the first controller based on captured sound data,
    wherein the system further includes a second controller configured like the first controller, wherein a three-dimensional location of the second controller is identified by the computer program, wherein the first controller and the second controller are configured for two-way sound communication used to determine a distance between the first controller and the second controller, the distance being transmitted to the computing system,
    wherein the computer program uses the determined distance between controllers in the identification of the three-dimensional locations of the controllers.

11. The system as recited in claim 10, wherein the spherical-type section further includes a retro-reflective area.

12. The system as recited in claim 10, wherein the spherical-type section has a predetermined color to assist in identifying the spherical shape in the captured image data.

13. The system as recited in claim 10, wherein the first controller further includes,
    a light source inside the spherical-type section,
    wherein the spherical-type section is translucent,
    wherein the light source illuminates the spherical-type section to assist in identifying the spherical shape in the captured image data.

14. The system as recited in claim 13, wherein the light source includes an infrared light source, wherein the image capture device further includes an infrared camera.

15. The system as recited in claim 14, wherein the image capture device further includes a visible-spectrum camera, wherein the image data from the infrared camera and the visible-spectrum camera are combined in the identification of the two-dimensional location.

16. The system as recited in claim 10, wherein the first controller and the second controller are physically connected serially along a longitudinal dimension,
    wherein both controllers are tracked by the computer program and the identified locations of the controllers are combined to improve accuracy.

17. The system as recited in claim 16, further comprising:
    an adapter defined between ends of the first controller and the second controller to enable connection.

18. The system as recited in claim 10, wherein the first controller and the second controller are physically connected in parallel along a longitudinal dimension, wherein a plate is used to connect the first controller and the second controller to form an integrated controller design to be held with two hands.

19. The system as recited in claim 10 further including,
a speaker connected to the computer system,
wherein the first controller further includes a controller sound capturing device,
wherein the first controller and the computer system establish an inverse one-way sound communication via the speaker and the controller sound capturing device.

20. The system as recited in claim 10, wherein the input pad is removable in order to accommodate different button configurations for the input pad.

21. The system as recited in claim 10, wherein the computer program tracks user movement by detecting a position of a user head within the captured image data or a position of a user torso within the captured image data.

22. The system as recited in claim 10, wherein the first controller further includes an inertial analyzer for tracking inertial activity of the first controller, the inertial activity transferred to the computer program in impact an action.

23. The system as recited in claim 10, wherein the sound emitting device further includes an acoustical chamber inside the first controller, the acoustical chamber defined to direct and receive sound in one or more directions.

24. The system as recited in claim 10, wherein the computer program samples some of the captured image and sound data, the computer program combining sampled data during the identification of the location of the first controller.

25. A system for establishing communication between a computer program and a controller, comprising:
an image capture device for capturing image data in a capture area in front of a display;
a sound capture device for capturing sound data in the capture area; and
a computing system for executing the computer program, the computing system being connected to the display, the image capture device, and the sound capture device;
wherein a first controller is operable to be held by a user with a single hand, the first controller including,
a body with a first end and a second end;
a grip area at about the first end;
an input pad defined between the first end and the second end for entering input data to be transmitted to the computing system;
a spherical-type section defined at the second end for facilitating image recognition by the image capture device of a spherical shape of the spherical-type section; and
a sound emitting device near the second end, the sound emitting device directed away from the user when held and configured for one-way sound communication with the sound capture device;
wherein the computer program identifies a two-dimensional location of the first controller based on the captured image data and a third dimensional location of the first controller based on captured sound data, wherein the identification of the third dimensional location further includes calculating a depth value of the third dimensional location by measuring time of flight and phase coherence of the one-way sound communication.

26. A system for establishing communication between a computer program and a controller, comprising:
a first set and a second set of light emitters facing a capture area in front of a display, the first and second set of light emitters located near the display;
a sound capture device for capturing sound data in the capture area; and
a computing system for executing the computer program, the computing system being connected to the display, and the sound capture device;
wherein the controller is operable to be held by a user with a single hand, the controller including,
a body with a first end and a second end;
a grip area at about the first end;
an input pad defined between the first end and the second end for entering input data to be transmitted to the computing system;
an image capture device near the second end for capturing image data of an area where the first and second set of light emitters are located;
a microphone; and
a sound emitting device near the second end, the sound emitting device directed away from the user when held, the microphone and the sound emitting device being configured for two-way sound communication with the sound capture device;
wherein the computer program identifies a two-dimensional location of the controller based on the captured image data and a third dimensional location of the controller based on sound data captured by the microphone and the sound emitting device.

27. The system as recited in claim 26, wherein a processor in the controller calculates a location of the controller based on the captured image data, wherein the controller transmits the calculated location to the computing system.

* * * * *